US012645387B1

(12) United States Patent
Vankamamidi et al.

(10) Patent No.: US 12,645,387 B1
(45) Date of Patent: Jun. 2, 2026

(54) TECHNIQUES FOR EFFICIENT IMPLEMENTATION OF OFFLOAD COPY COMMANDS

(71) Applicant: Dell Products L.P., Hopkinton, MA (US)

(72) Inventors: Vamsi K. Vankamamidi, Hopkinton, MA (US); Mayank Ajmera, Cary, NC (US); Vikram A. Prabhakar, Apex, NC (US); Socheavy D. Heng, Framingham, MA (US)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 19/018,634

(22) Filed: Jan. 13, 2025

(51) Int. Cl.
*G06F 3/06* (2006.01)

(52) U.S. Cl.
CPC ............ *G06F 3/065* (2013.01); *G06F 3/0604* (2013.01); *G06F 3/0644* (2013.01); *G06F 3/067* (2013.01)

(58) Field of Classification Search
CPC ...... G06F 3/065; G06F 3/0604; G06F 3/0643; G06F 3/0644; G06F 3/067; G06F 3/061; G06F 3/0614; G06F 3/0679; G06F 3/0689; G06F 9/467; G06F 16/2255; G06F 2003/0692
See application file for complete search history.

(56) References Cited

U.S. PATENT DOCUMENTS

| | | | |
|---|---|---|---|
| 2015/0370492 A1* | 12/2015 | Satnur | G06F 3/0659 |
| | | | 711/114 |
| 2023/0035390 A1* | 2/2023 | Shani | G06F 3/065 |
| 2024/0028240 A1* | 1/2024 | Shani | G06F 3/0608 |

* cited by examiner

*Primary Examiner* — Tracy C Chan
(74) *Attorney, Agent, or Firm* — BainwoodHuang

(57) ABSTRACT

Techniques can include: receiving an extended copy request to copy content from a source location to a target location; partitioning the content into segments; and for each of the segments, performing processing including: determining, based at least in part, on a starting logical address of said each segment, one core of a plurality of cores; determining, based on one or more remapping criteria, whether to assign said each segment to the one core for extended copy processing; and responsive to determining to assign said each segment to the one core, performing second processing including: sending said each segment to the one core for extended copy processing; and updating a corresponding core mapping, for said starting logical address of said each segment, to specify to use the one core for extended copy processing of said each segment in connection with other extended copy requests.

20 Claims, 11 Drawing Sheets

| Segment # | Source segment starting LA | CPU core distribution |
|-----------|---------------------------|----------------------|
| 1 | 0x 2000000 | C2 |
| 2 | 0x 2100000 | C3 |
| 3 | 0x 2200000 | C4 |
| 4 | 0x 2300000 | C5 |
| 5 | 0x 2400000 | C6 |
| 6 | 0x 2500000 | C7 |
| 7 | 0x 2600000 | C8 |
| 8 | 0x 2700000 | C9 |
| 9 | 0x 2800000 | C0 |
| 10 | 0x 2900000 | C1 |
| 11 | 0x 2A00000 | C2 |
| 12 | 0x 2B00000 | C3 |

| Segment # | Source segment starting LA | CPU core distribution |
|---|---|---|
| 1 | 0x 2000000 | C8 |
| 2 | 0x 2100000 | C9 |
| 3 | 0x 2200000 | C4 |
| 4 | 0x 2300000 | C5 |
| 5 | 0x 2400000 | C6 |
| 6 | 0x 2500000 | C7 |
| 7 | 0x 2600000 | C8 |
| 8 | 0x 2700000 | C9 |
| 9 | 0x 2800000 | C0 |
| 10 | 0x 2900000 | C1 |
| 11 | 0x 2A00000 | C2 |
| 12 | 0x 2B00000 | C3 |

FIG. 3B

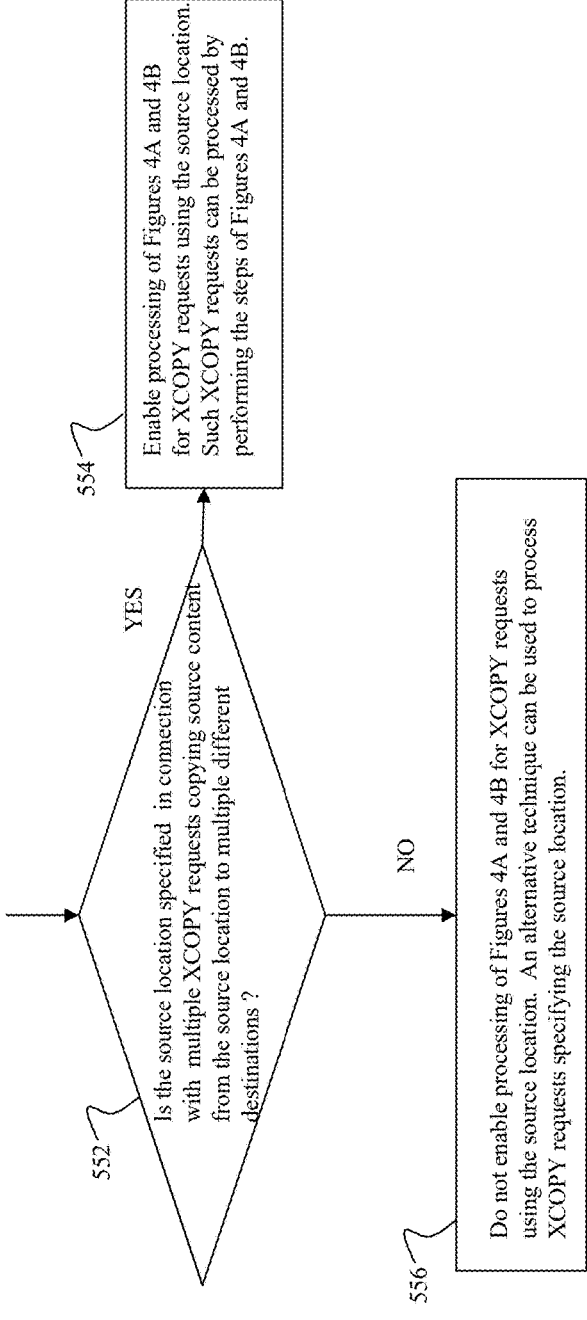

550

552 — Is the source location specified in connection with multiple XCOPY requests copying source content from the source location to multiple different destinations ?

YES

554 — Enable processing of Figures 4A and 4B for XCOPY requests using the source location. Such XCOPY requests can be processed by performing the steps of Figures 4A and 4B.

NO

556 — Do not enable processing of Figures 4A and 4B for XCOPY requests using the source location. An alternative technique can be used to process XCOPY requests specifying the source location.

FIG. 5B

TECHNIQUES FOR EFFICIENT IMPLEMENTATION OF OFFLOAD COPY COMMANDS

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY OF THE PRESENT DISCLOSURE

Various embodiments of the techniques herein can include a computer-implemented method, a system and a non-transitory computer readable medium. The system can include one or more processors, and a memory comprising code that, when executed, performs the method. The non-transitory computer readable medium can include code stored thereon that, when executed, performs the method. The method can comprise: receiving a first extended copy request to copy first source content from a first source location to a first target location; partitioning the first source content into a plurality of segments; and for each of the plurality of segments, performing first processing including: determining, based at least in part, on a starting logical address of said each segment, one core of a plurality of cores; determining, based on one or more remapping criteria, whether to assign said each segment to the one core for extended copy processing of said each segment for the first extended copy request; and responsive to determining to assign said each segment to the one core for extended copy processing of said each segment for the first extended copy request, performing second processing including: sending said each segment to the one core for extended copy processing of said each segment by the one core; and updating a corresponding core mapping, for said starting logical address of said each segment, to specify to use the one core for extended copy processing of said each segment in connection with subsequent extended copy requests.

In at least one embodiment, the plurality of segments can include a first segment, and wherein said first processing for the first segment can include: determining, based at least in part, on a first starting logical address of the first segment, a first core of the plurality of cores; and determining, based on the one or more remapping criteria, to assign the first segment to the first core for extended copy processing of the first segment for the first extended copy request. The second processing for the first segment can include updating a first core mapping for the first starting logical address of the first segment to specify to use the first core for copying the first segment in connection with the one or more subsequent extended copy requests.

In at least one embodiment, processing can include: receiving a second extended copy request to copy the first source content from the first source location to a second target location which is different from the first target location, wherein the second extended copy request is included in the subsequent extended copy requests; partitioning the first source content into a second plurality of segments including the first segment with the first starting logical address; determining, based on the first starting logical address, that the first segment has the first core mapping identifying the first core; and determining, based on the one or more remapping criteria and as identified using the first core mapping, to assign the first segment to the first core for extended copy processing of the first segment of the second extended copy request. The extended copy processing of the first segment for the second extended copy request by the first core can include copying, by the first core, said first segment from the first starting logical address of the first segment to a corresponding target logical address of the second target location of the second extended copy request.

In at least one embodiment, processing can include: receiving a second extended copy request to copy the first source content from the first source location to a second target location which is different from the first target location, wherein the second extended copy request is included in the subsequent extended copy requests; partitioning the first source content into a second plurality of segments including the first segment with the first starting logical address; determining, based on the first starting logical address, that the first segment has the first core mapping identifying the first core; determining, based on the one or more remapping criteria and as identified using the first core mapping, not to assign the first segment to the first core for extended copy processing of the first segment of the second extended copy request; and responsive to determining not to assign the first segment to the first core for extended copy processing of the first segment of the second extended copy request, performing third processing. The third processing can include: determining, based on the one or more remapping criteria, a second core of the plurality of cores; sending the first segment to the second core for extended copy processing of the second segment of the second extended copy request; and updating the first core mapping, for the first starting logical address of the first segment, to specify to use the second core for extended copy processing of the first segment in connection with subsequent extended copy requests. The extended copy processing of the second segment of the second extended copy request by the second core can include copying, by the second core, said first segment from the first starting logical address of the first segment to a corresponding target logical address of the second target location of the second extended copy request. The extended copy processing of said each segment for the first extended copy request by the one core can include copying, by said one core, said each segment from the starting logical address of said each segment to a corresponding target logical address of the first target location of the first extended copy request.

In at least one embodiment, the one or more remapping criteria can specify to assign said each segment to the one core for extended copy processing of said each segment for the first extended copy request if the one core is not performing background processing. The one or more remapping criteria can specify to assign said each segment to the one core for extended copy processing of said each segment for the first extended copy request if the one core is not performing flush processing. The one or more remapping criteria can specify to assign said each segment to the one core for extended copy processing of said each segment for the first extended copy request if the one core is not performing processing for a task having a higher priority than extended copy processing. The one or more remapping criteria can specify to assign said each segment to the one core for extended copy processing of said each segment for the first extended copy request if the one core has a workload below a specified threshold level. The workload of the one core can be determined, based at least in part, on any one or more of: i) a utilization of said one core; ii) a queue length of pending or incomplete jobs, tasks or threads assigned to the one core where each item in the queue denotes a job, task or thread scheduled for execution on the core but whose processing is not yet complete; and iii) the average I/O latency of said one core. The plurality of cores can be cores of an I/O core set dedicated to servicing client commands and requests that read and/or write content.

In at least one embodiment, processing can include: recording the first extended copy request in a log; and responsive to recording the first extended copy request in the log, returning an acknowledgement to the first extended copy request. Processing can comprise flushing the first extended copy request from the log, including: creating and/or updating first mapping information that maps the first target location to the first source content of the first source location.

In at least one embodiment, each of the plurality of cores can have a corresponding one of a plurality of indices denoting a sequence of consecutive integers beginning with 0, wherein N denotes a number of cores of the plurality of cores, and where each of the plurality of segments is a defined segment size. Determining the one core, based at least in part, on the starting logical address of said each segment, can include calculating an index of the one core by determining a remainder of the starting logical address of said each segment divided by a first quantity, where the first quantity is a mathematical product of N multiplied by the defined segment size.

BRIEF DESCRIPTION OF THE DRAWINGS

Features and advantages of the present disclosure will become more apparent from the following detailed description of exemplary embodiments thereof taken in conjunction with the accompanying drawings in which:

FIGS. 3A and 3B are examples illustrating core mappings that can be used in at least one embodiment in accordance with the techniques of the present disclosure.

FIGS. 4A, 4B, 5A and 5B are flowcharts of processing steps that can be performed in at least one embodiment in accordance with the techniques of the present disclosure.

DETAILED DESCRIPTION OF EMBODIMENT(S)

Figure 1:
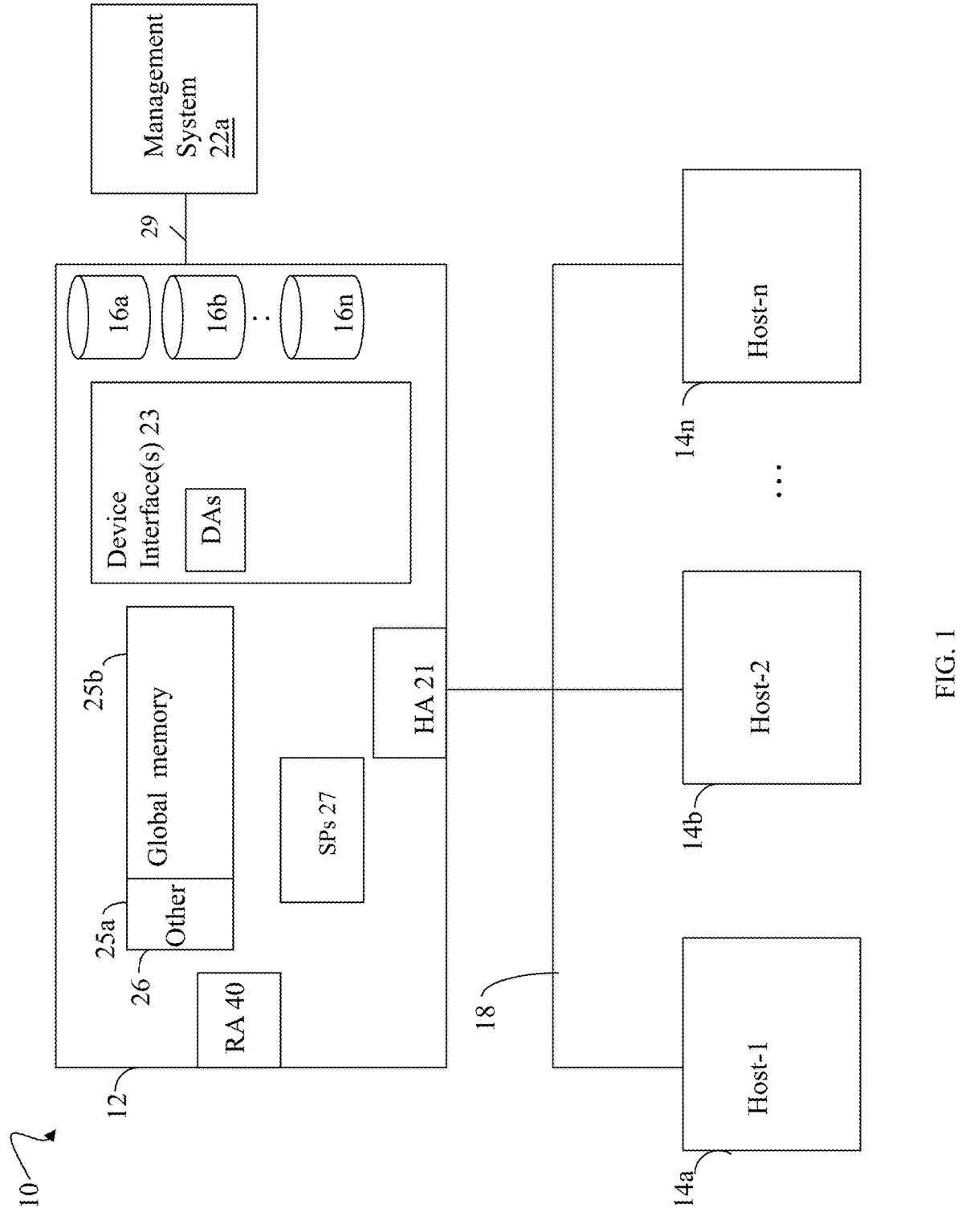
FIG. 1 is an example of components that may be included in a system in accordance with the techniques of the present disclosure.

In at least one embodiment, different commands or operations can be supported for writing or storing content to target logical addresses, where such write commands or operations can be recorded in the log. The commands can include host write I/O operations that are stored in the log and then flushed for further processing from the log. In at least one embodiment, the commands can include offload copy operations such as the XCOPY or extended copy operation or command.

The XCOPY or extended copy command can more generally denote an offload copy operation performed internally within the storage system where the source and destination or target of the copy can be within the same storage system or appliance. At least initially after performing the XCOPY operation, the source and target or destination of the XCOPY operation include the same content or data, where content is copied from the source to the target or destination. The XCOPY command can be issued, for example, from a host to the storage system to request that the storage system copy content from a source to a target location where both the source and target locations are in the storage system. In this manner, data to be written is not sent over a connection from the host to the storage system but rather copied internally by the storage system.

In at least one embodiment, the XCOPY command to copy content from a source logical address LA1 to a target logical address LA2, can include acquiring a read or shared lock on LA1 and a write or exclusive lock on LA2. In at least one embodiment of a system with multiple nodes where each of the multiple nodes reads content from the same source LA1 to copy data to a different corresponding target logical address, additional overhead can be incurred in connection with internode communication for locking to synchronize access to LA1 for multiple reader nodes.

In at least one embodiment, the XCOPY command, or more generally offload copy commands or operations, can be recorded in the log and subsequently flushed from the log in a manner similar to that as discussed above where mapping information of metadata pages can be created and/or updated to map target logical addresses to corresponding physical storage locations of content stored at the target logical addresses. Similar to a write I/O as noted above, most of the work for the XCOPY command can be performed when the XCOPY command is flushed from the log. In at least one embodiment, when the XCOPY command of the log is flushed, processing can include creating corresponding mapping information of metadata pages to map target logical addresses to the same stored content as corresponding source logical addresses.

In at least one embodiment, XCOPY can be implemented by reading the source content from source logical addresses and writing the content to corresponding target logical addresses. In at least one embodiment, deduplication can be performed to avoid consuming additional storage. As a further optimization in at least one embodiment, XCOPY commands can be implemented using a metadata-copy operation instead of a full data-copy operation. Put another way, instead of reading and writing the actual data, flushing the XCOPY command from the log to store the source content from source logical addresses to corresponding target logical addresses can be performed as generally a metadata-copy operation instead of a full data-copy operation. Put another way in at least one embodiment, instead of reading and writing the data, mapping information corresponding to the target logical addresses of the XCOPY command can be updated and/or creating to map to the same content as the source logical addresses. In this manner in at least one embodiment, XCOPY commands flushed from the log can have corresponding target logical addresses associated with corresponding source content of corresponding source logical addresses without actually writing any data to the drives. Thus in at least one embodiment, XCOPY can be implemented by copying or duplicating relevant portions of metadata of mapping information to map the target logical addresses to the same corresponding contents of corresponding source logical addresses.

In at least one embodiment, an XCOPY command or request can be partitioned into smaller segments of a segment size. In at least one embodiment, the segment size can be 1 MB. More generally, any suitable segment size can be used with the techniques of the present disclosure. In at least one embodiment, the segment size can generally be an integer multiple of the size of a cached data page. For example, in at least one embodiment, the cache can store data in pages where each page is a size of 4K. In at least one embodiment, the XCOPY segment size can be 1 MB and the data pages size of each cached data page can be 4K such that each XCOPY segment can correspond to 256 data pages, where each data page is 4K bytes in size. In at least one embodiment, XCOPY commands can be partitioned into subcommands or requests each for performing XCOPY processing or offload copying of a 1 MB segment or portion of content from a source location to a corresponding target location. In at least one embodiment, each of the 1 MB copy requests (sometimes referred to as XCOPY or offload copy requests) can be tracked at the 1 MB granularity by a data cache component in a hash table rather than, for example, tracking 256 data pages (where each data page can be 4K bytes) thereby significantly reducing the memory footprint in the cache. The foregoing can allow, for example, the cache to ingest TBs worth of XCOPY requests even though the cache size may be much smaller such as, for example, only 10s of GBs.

As noted above in at least one embodiment, the XCOPY command can be persistently recorded in the log as a copy request that is later flushed from the log. When the XCOPY command is flushed from the log, flush processing can include copying of the mapping metadata corresponding to the source offset or logical address to the corresponding target or destination offset or logical address. In at least one embodiment, the foregoing can be performed by creating and/or updating a few metadata pages as opposed to reading content of the entire source range and writing the content back out to the target or destination range. The foregoing approach in at least one embodiment allows the data path efficiently to handle bursts of XCOPY requests and achieve very high XCOPY bandwidth without needing large amounts of memory. The foregoing approach is bound mostly by CPU processing power. Increasing the CPU power (alternatively further optimizing the CPU utilization for XCOPY) can further improve XCOPY bandwidth.

In at least one embodiment, a dedicated set of CPU cores of each node can be specified as dedicated to servicing host or more generally client I/Os or client commands and operations that read and/or write content. The foregoing dedicated set of CPU cores can be referred to as I/O cores. In at least one embodiment, the set of I/O cores can be used to service host (e.g., client) read and write I/Os and commands including, the extended copy operations or commands such as the XCOPY command. To use these I/O cores efficiently and to keep the load balanced, the data path can distribute the host I/Os or commands across these cores in a round-robin manner. The foregoing distribution can also take into account, for example, the load on the system from background operations or BG operations to maintain predictable latency for host I/Os. In at least one embodiment, such BG operations can include flushing of the log and processing recorded commands flushed from the log as discussed above. XCOPY requests can be treated similarly though they can differ in locality distribution from other kinds of host or client I/Os.

In at least one embodiment of a storage system, typical use cases that can be associated with XCOPY requests are when new VMs (virtual machines) are deployed or VMs are being migrated. These XCOPY commands or requests can be performed in bulk (e.g., deployment of several VMs from a template) and can have a 1-to-many aspect. For example, one or more commands can be issued to the storage system in connection with creating 100 new VMs from a template. The template can have a corresponding source location on the storage system. For the 100 VMs, the storage system can receive 100 corresponding XCOPY requests to create data for the 100 VMs where such 100 copies of VM data is stored on the storage system. Each of the 100 XCOPY requests can request to copy the template content from a source location to a corresponding target location corresponding to the VM to be created. In this manner, the 100 XCOPY requests can have the same source (e.g., of the template) but where each of the 100 XCOPY requests can have a different target location corresponding to different one of the 100 VMs.

In at least one embodiment, the 1 MB segments of the foregoing XCOPY requests can be distributed across the set of dedicated I/O cores. XCOPY requests with the same source offset but different destinations can arrive in the cache simultaneously and result in increased contention for various resources. For example, such XCOPY requests can contend for the same hash buckets and same pages in cache. Such contention can reduce the XCOPY throughput. Additionally, in at least one embodiment, the cache can manage stored data pages based, at least in part, on an LRU or least recently used policy. With an LRU policy, pages can be selected for eviction or removal from cache based, at least in part, on when the cached data page was most recently referenced. With an LRU policy, the least recently used pages can be selected for eviction or removal from cache before other data pages that are more recently used or referenced. In at least one embodiment, the LRU information used for pages in cache can be maintained on per-core LRU queues to reduce contention. In at least one embodiment, LRU information for a page in cache can be placed on the LRU queue of the corresponding particular core that last or most recently accessed the page, where the corresponding core can also handle updating the LRU information as needed while on the queue of the corresponding core. Due to foregoing in at least one embodiment, even if multiple XCOPY requests don't arrive at the cache simultaneously, multiple XCOPY requests accessing the same source location or logical addresses can still cause contention with resources such as the hash table and/or LRU queues. With the LRU queues, the LRU information of source pages can be moved between a first LRU queue of one core to a second LRU queue of another core, thereby requiring synchronization such as locking both the first and second LRU queues to reassign or move LRU information between the LRU queues.

In at least one embodiment, techniques of the present disclosure can improve the locality of XCOPY request segments processed by the various CPU cores to thereby improve XCOPY performance and system performance. The techniques of the present disclosure affine processing of XCOPY requests segments to CPU cores based, at least in part, on the corresponding source logical addresses of the segments. The techniques of the present disclosure manage how the XCOPY segments are distributed over or among the CPU cores. In at least one embodiment, the CPU cores over which the XCOPY segments are distributed can be those of the I/O core set of cores dedicated to serving host or client I/Os.

In at least one embodiment, the techniques of the present disclosure can provide for dynamically switching the particular CPU core affined to servicing a particular XCOPY segment having a corresponding starting source logical address based, at least on part, on one or more remapping conditions or criteria. In at least one embodiment, the one or more remapping conditions can provide for switching the particular CPU core affined to the particular XCOPY segment if the currently affined CPU core is saturated, busy, and/or is executing a task, thread or process having a first priority that is higher than a particular priority associated with XCOPY processing.

In at least one embodiment, the techniques of the present disclosure provide for improved CPU efficiency of XCOPY commands and improving the XCOPY bandwidth that can be achieved.

In at least one embodiment by affining processing of XCOPY request segments based on the corresponding starting source logical addresses: i) lock contention between LRU queues noted above can be reduced; ii) CPU contention and CPU processing time of XCOPY requests for the same segment of source pages can be reduced, for example, by reducing lock contention for hash tablet buckets and structures representing the source pages; and iii) the locality of different data cache structures in the CPU lower level caches (e.g., on chip CPU caches) can be improved.

The foregoing and other aspects of the techniques of the present disclosure are discussed in more detail in the following paragraphs.

Referring to the FIG. 1, shown is an example of an embodiment of a SAN 10 that is used in connection with performing the techniques described herein. The SAN 10 includes a data storage system 12 connected to the host systems (also sometimes referred to as hosts) 14a-14n through the communication medium 18. In this embodiment of the SAN 10, the n hosts 14a-14n access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, a network, or other wireless or other hardwired connection(s) by which the host systems 14a-14n access and communicate with the data storage system 12, and also communicate with other components included in the SAN 10.

Each of the host systems 14a-14n and the data storage system 12 included in the SAN 10 are connected to the communication medium 18 by any one of a variety of connections as provided and supported in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software included in the data storage system 12 are described herein in more detail, and can vary with each particular embodiment. Each of the hosts 14a-14n and the data storage system 12 can all be located at the same physical site, or, alternatively, be located in different physical locations. The communication medium 18 used for communication between the host systems 14a-14n and the data storage system 12 of the SAN 10 can use a variety of different communication protocols such as block-based protocols (e.g., SCSI, FC, ISCSI, and/or NVMe (Non-Volatile Memory express)), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n issues a data request to the data storage system 12 to perform a data operation. For example, an application executing on one of the host computers 14a-14n performs a read or write operation resulting in one or more data requests to the data storage system 12.

It should be noted that although the element 12 is illustrated as a single data storage system, such as a single data storage array, the element 12 also represents, for example, multiple data storage arrays alone, or in combination with, other data storage devices, systems, appliances, and/or components having suitable connectivity to the SAN 10 in an embodiment using the techniques herein. It should also be noted that an embodiment can include data storage arrays or other components from one or more vendors. In subsequent examples illustrating the techniques herein, reference is made to a single data storage array by a vendor. However, as will be appreciated by those skilled in the art, the techniques herein are applicable for use with other data storage arrays by other vendors and with other components than as described herein for purposes of example.

In at least one embodiment, the data storage system 12 is a data storage appliance or a data storage array including a plurality of data storage devices (PDs) 16a-16n. The data storage devices 16a-16n include one or more types of data storage devices such as, for example, one or more rotating disk drives and/or one or more non-volatile solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contains no moving mechanical parts. In at least one embodiment, the flash devices can be constructed using nonvolatile semiconductor NAND flash memory. The flash devices include, for example, one or more SLC (single level cell) devices, MLC (multi level cell) devices, TLC (triple level cell) devices and/or QLC (quad level cell) devices.

In at least one embodiment, the data storage system or array includes different types of controllers, adapters or directors, such as an HA 21 (host adapter), RA 40 (remote adapter), and/or device interface(s) 23.

Each of the adapters (sometimes also known as controllers, directors or interface components) can be implemented using hardware including a processor with a local memory with code stored thereon for execution in connection with performing different operations. The HAs are used to manage communications and data operations between one or more host systems and the global memory (GM). In an embodiment, the HA is a Fibre Channel Adapter (FA) or other adapter which facilitates host communication. The HA 21 can be characterized as a front end component of the data storage system which receives a request from one of the hosts 14*a-n*. In at least one embodiment, the data storage array or system includes one or more RAs used, for example, to facilitate communications between data storage arrays. The data storage array also includes one or more device interfaces 23 for facilitating data transfers to/from the data storage devices 16*a*-16*n*. The data storage device interfaces 23 include device interface modules, for example, one or more disk adapters (DAs) (e.g., disk controllers) for interfacing with the flash drives or other physical storage devices (e.g., PDs 16*a-n*). The DAs can also be characterized as back end components of the data storage system which interface with the physical data storage devices.

One or more internal logical communication paths exist between the device interfaces 23, the RAs 40, the HAs 21, and the memory 26. An embodiment, for example, uses one or more internal busses and/or communication modules. In at least one embodiment, the global memory portion 25*b* is used to facilitate data transfers and other communications between the device interfaces, the HAs and/or the RAs in a data storage array. In one embodiment, the device interfaces 23 performs data operations using a system cache included in the global memory 25*b*, for example, when communicating with other device interfaces and other components of the data storage array. The other portion 25*a* is that portion of the memory used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14*a*-14*n* provide data and access control information through channels to the storage systems 12, and the storage systems 12 also provide data to the host systems 14*a-n* also through the channels. The host systems 14*a-n* do not address the drives or devices 16*a*-16*n* of the storage systems directly, but rather access to data is provided to one or more host systems from what the host systems view as a plurality of logical devices, logical volumes (LVs) also referred to herein as logical units (e.g., LUNs). A logical unit (LUN) can be characterized as a disk array or data storage system reference to an amount of storage space that has been formatted and allocated for use to one or more hosts. A logical unit has a logical unit number that is an I/O address for the logical unit. As used herein, a LUN or LUNs refers to the different logical units of storage referenced by such logical unit numbers. The LUNs have storage provisioned from portions of one or more physical disk drives or more generally physical storage devices. For example, one or more LUNs can reside on a single physical disk drive, data of a single LUN can reside on multiple different physical devices, and the like. Data in a single data storage system, such as a single data storage array, can be accessible to multiple hosts allowing the hosts to share the data residing therein. The HAs are used in connection with communications between a data storage array and a host system. The RAs are used in facilitating communications between two data storage arrays. The DAs include one or more types of device interfaced used in connection with facilitating data transfers to/from the associated disk drive(s) and LUN(s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system as described can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein are made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22*a* used to manage and monitor the data storage system 12. In one embodiment, the management system 22*a* is a computer system which includes data storage system management software or application that executes in a web browser. A data storage system manager can, for example, view information about a current data storage configuration such as LUNs, storage pools, and the like, on a user interface (UI) in a display device of the management system 22*a*. Alternatively, and more generally, the management software can execute on any suitable processor in any suitable system. For example, the data storage system management software can execute on a processor of the data storage system 12.

Information regarding the data storage system configuration is stored in any suitable data container, such as a database. The data storage system configuration information stored in the database generally describes the various physical and logical entities in the current data storage system configuration. The data storage system configuration information describes, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, data storage system performance information such as regarding various storage objects and other entities in the system, and the like.

Consistent with other discussion herein, management commands issued over the control or management path include commands that query or read selected portions of the data storage system configuration, such as information regarding the properties or attributes of one or more LUNs. The management commands also include commands that write, update, or modify the data storage system configuration, such as, for example, to create or provision a new LUN (e.g., which result in modifying one or more database tables such as to add information for the new LUN), and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN is accessed by the device interface following a data request in connection with I/O operations. For example, a host issues an I/O operation that is received by the HA 21. The I/O operation identifies a target location from which data is read from, or written to, depending on whether the I/O operation is, respectively, a read or a write operation request. In at least one embodiment using block storage services, the target location of the received I/O operation is expressed in terms of a LUN and logical address or offset location (e.g., LBA or logical block address) on the LUN. Processing is performed on the data storage system to further map the target location of the received I/O operation, expressed in terms of a LUN and logical address or offset location on the LUN, to its corresponding physical storage device (PD) and location on the PD. The DA which services the particular PD performs processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique described herein for exemplary purposes. For example, the element 12 of the FIG. 1 in one embodiment is a data storage system, such as a data storage array, that includes multiple storage processors (SPs). Each of the SPs 27 is a CPU including one or more "cores" or processors and each have their own memory used for communication between the different front end and back end components rather than utilize a global memory accessible to all storage processors. In such embodiments, the memory 26 represents memory of each such storage processor.

Generally, the techniques herein can be used in connection with any suitable storage system, appliance, device, and the like, in which data is stored. For example, an embodiment can implement the techniques herein using a midrange data storage system as well as a higher end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path is the logical flow through hardware and software components or layers in connection with issuing data storage management command to and/or from a data storage system, and also receiving responses (possibly including requested data) to such control or management commands. For example, with reference to the FIG. 1, the control commands are issued from data storage management software executing on the management system 22a to the data storage system 12. Such commands, for example, establish or modify data services, provision storage, perform user account management, and the like. Consistent with other discussion herein, management commands result in processing that can include reading and/or modifying information in the database storing data storage system configuration information.

The data path and control path define two sets of different logical flow paths. In at least some of the data storage system configurations, at least part of the hardware and network connections used for each of the data path and control path differ. For example, although both control path and data path generally use a network for communications, some of the hardware and software used can differ. For example, with reference to the FIG. 1, a data storage system has a separate physical connection 29 from a management system 22a to the data storage system 12 being managed whereby control commands are issued over such a physical connection 29. However, user I/O commands are never issued over such a physical connection 29 provided solely for purposes of connecting the management system to the data storage system. In any case, the data path and control path each define two separate logical flow paths.

Figure 2A:
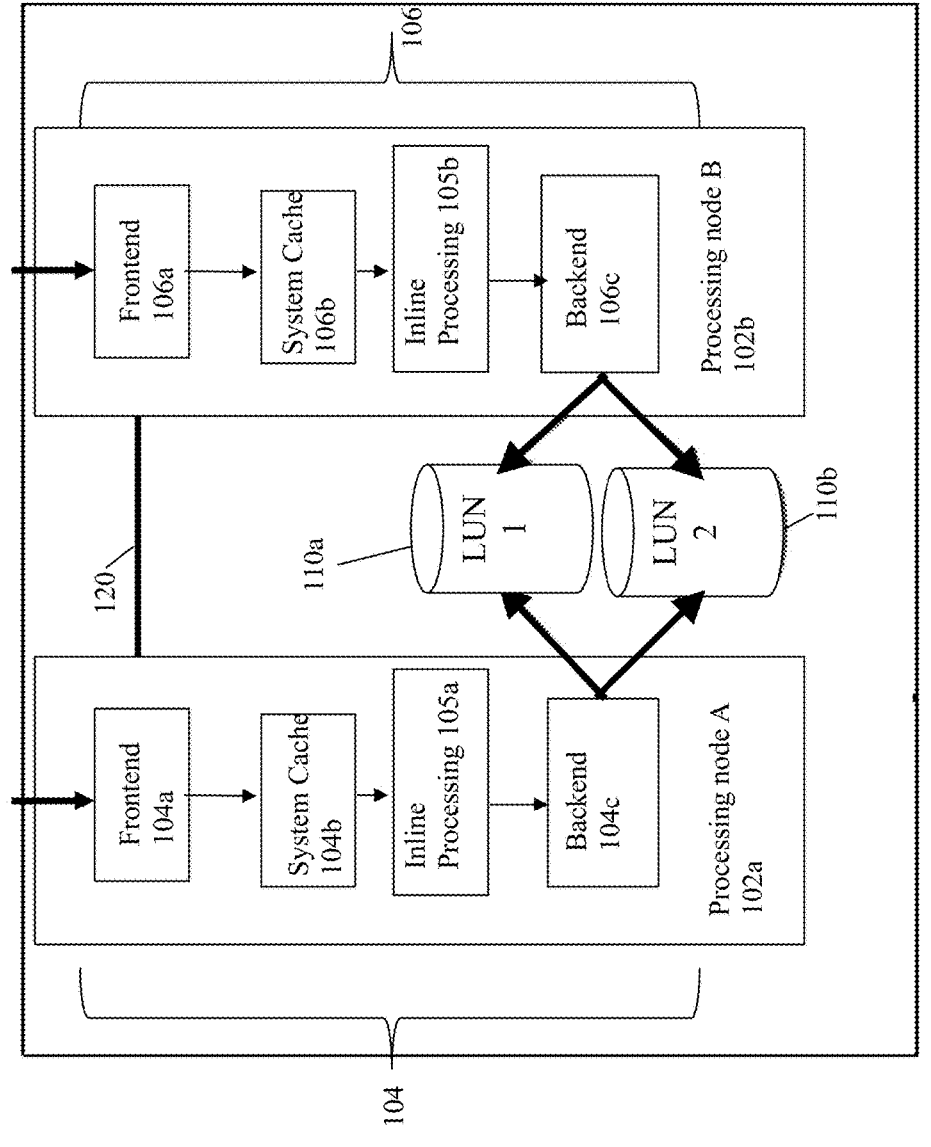
FIG. 2A is an example illustrating the I/O path or data path in connection with processing data in at least one embodiment in accordance with the techniques of the present disclosure.

With reference to the FIG. 2A, shown is an example 100 illustrating components that can be included in the data path in at least one existing data storage system in accordance with the techniques of the present disclosure. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104*b* to the back-end non-volatile physical storage 110*a*, 110*b*, as well as when retrieving data from the back-end non-volatile physical storage 110*a*, 110*b* to be stored in the system cache layer 104*b*. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102*b* has its own FE component 106*a*, system cache layer 106*b*, inline processing layer 105*b*, and BE component 106*c* that are respectively similar to the components 104*a*, 104*b*, 105*a* and 104*c*. The elements 110*a*, 110*b* denote the non-volatile BE physical storage provisioned from PDs for the LUNs, whereby an I/O can be directed to a location or logical address of a LUN and where data can be read from, or written to, the logical address. The LUNs 110*a*, 110*b* are examples of storage objects representing logical storage entities included in an existing data storage system configuration. Since, in this example, writes, or more generally I/Os, directed to the LUNs 110*a*, 110*b* can be received for processing by either of the nodes 102*a* and 102*b*, the example 100 illustrates what can also be referred to as an active-active configuration.

In connection with a write operation received from a host and processed by the processing node A 102*a*, the write data can be written to the system cache 104*b*, marked as write pending (WP) denoting it needs to be written to the physical storage 110*a*, 110*b* and, at a later point in time, the write data can be destaged or flushed from the system cache to the physical storage 110*a*, 110*b* by the BE component 104*c*. The write request can be considered complete once the write data has been stored in the system cache whereby an acknowledgement regarding the completion can be returned to the host (e.g., by component the 104*a*). At various points in time, the WP data stored in the system cache is flushed or written out to the physical storage 110*a*, 110*b*.

In connection with the inline processing layer 105*a*, prior to storing the original data on the physical storage 110*a*, 110*b*, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110*a*, 110*b*.

In connection with a read operation to read a block of data, a determination is made as to whether the requested read data block is stored in its original form (in system cache 104*b* or on physical storage 110*a*, 110*b*), or whether the requested read data block is stored in a different modified form or representation. If the requested read data block (which is stored in its original form) is in the system cache, the read data block is retrieved from the system cache 104*b* and returned to the host. Otherwise, if the requested read data block is not in the system cache 104*b* but is stored on the physical storage 110*a*, 110*b* in its original form, the requested data block is read by the BE component 104*c* from the backend storage 110*a*, 110*b*, stored in the system cache and then returned to the host.

If the requested read data block is not stored in its original form, the original form of the read data block is recreated and stored in the system cache in its original form so that it can be returned to the host. Thus, requested read data stored on physical storage 110*a*, 110*b* can be stored in a modified form where processing is performed by 105*a* to restore or convert the modified form of the data to its original data form prior to returning the requested read data to the host.

Also illustrated in FIG. 2A is an internal network interconnect 120 between the nodes 102*a*, 102*b*. In at least one embodiment, the interconnect 120 can be used for internode communication between the nodes 102*a*, 102*b*.

In connection with at least one embodiment in accordance with the techniques of the present disclosure, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM used as main memory. The processor cache can be substantially faster than the system RAM used as main memory. The processor cache can contain information that the processor will be immediately and repeatedly accessing. The faster memory of the CPU cache can for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105*a*, 105*b* as noted above, data can be loaded from the main memory and/or other lower cache levels into its CPU cache.

In at least one embodiment, the data storage system can be configured to include one or more pairs of nodes, where each pair of nodes can be generally as described and represented as the nodes 102*a*-*b* in the FIG. 2A. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102*a* is the peer node of the node B 102*b*, and the node B 102*b* is the peer node of the node A 102*a*.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2A, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes are not shared with other pairs of nodes. A host can access data stored on a BE PD through the node pair associated with or attached to the PD.

In at least one embodiment, each pair of nodes provides a dual node architecture where both nodes of the pair can be generally identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Consistent with other discussion herein, a cache can be used for caching write I/O data and other cached information. In one system, the cache used for caching logged writes can be implemented using multiple caching devices or PDs, such as non-volatile (NV) SSDs such as NVRAM devices that are external with respect to both of the nodes or storage controllers. The caching devices or PDs used to implement the cache can be configured in a RAID group of any suitable RAID level for data protection. In at least one embodiment, the caching PDs form a shared non-volatile cache accessible to both nodes of the dual node architecture. It should be noted that in a system where the caching devices or PDs are external with respect to the two nodes, the caching devices or PDs are in addition to other non-volatile PDs accessible to both nodes. The additional PDs provide the BE non-volatile storage for the nodes where the cached data stored on the caching devices or PDs is eventually flushed to the BE PDs as discussed elsewhere herein. In at least one embodiment, a portion of each node's local volatile memory can also be used for caching information, such as blocks or pages of user data and metadata. For example, such node-local cached pages of user data and metadata (e.g., of mapping information used to map a logical address to a corresponding physical location storing content of the logical address) can be used in connection with servicing reads for such user data and metadata.

In the following paragraphs, the one or more caching devices or PDs may be referred to as a data journal or log used in the data storage system. In such a system, the caching devices or PDs are non-volatile log devices or PDs upon which the log is persistently stored. It should be noted that as discussed elsewhere herein, both nodes can also each have local volatile memory used as a node local cache for storing data, structures and other information. In at least one embodiment, the local volatile memory local to one of the nodes is used exclusively by that one node.

In a data storage system, minimizing the latency of I/O requests is a critical performance metric. In at least one data storage system using the dual node architecture such as described in connection with FIG. 2A, for write operations, latency can be affected by the amount of time taken to store the write data in the log where the write data is visible to both nodes or controllers of the system.

Consistent with other discussion herein, the log file used to log user operations, such as write I/Os, can be used to optimize write operation latency. Generally, a write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse.

It should be noted that the flushing of the log can be performed in response to an occurrence of any one or more defined conditions. For example, the log can be flushed in response to determining that the amount of reclaimed log space available for use and allocation is less than a specified threshold amount or size.

In at least one embodiment, a metadata (MD) structure of mapping information can be used in accordance with the techniques herein. The mapping information can be used, for example, to map a logical address, such as a LUN and an LBA or offset, to its corresponding storage location, such as a physical storage location on BE non-volatile PDs of the system. Consistent with discussion elsewhere herein, write requests or operations stored in the log can be flushed to the BE PDs (non-volatile) providing storage locations for the written data. For example, a logged write operation that writes first data to a logical address can be flushed whereby the logged first data is written out to a physical storage location on a BE PD. The mapping information can be used to map the logical address to the physical storage location containing the content or data stored at the logical address.

In at least one embodiment, the mapping information includes a MD structure that is hierarchical structure of multiple layers of MD pages or blocks.

In at least one embodiment, the mapping information or MD structure for a LUN, such as a LUN A, can be in the form of a tree having a plurality of levels of MD pages. More generally, the mapping structure can be in the form of any ordered list or hierarchical structure. In at least one embodiment, the mapping structure for the LUN A can include LUN MD in the form of a tree having 3 levels including a single top or root node (TOP node), a single mid-level (MID node) and a bottom level of leaf nodes (LEAF nodes), where each of the MD page leaf nodes can point to, or reference (directly or indirectly) one or more pages of stored data, such as user data stored on the LUN A. Each node in the tree corresponds to a MD page including MD for the LUN A. More generally, the tree or other hierarchical structure of various MD pages of the mapping structure for the LUN A can include any suitable number of levels, such as more than 3 levels where there are multiple mid-levels. In at least one embodiment the tree of MD pages for the LUN can be a B+ tree, also sometimes referred to as an "N-ary" tree, where "N" indicates that each node in the tree structure can have up to a maximum of N child nodes. For example, in at least one embodiment, the tree of MD pages for the LUN can specify N=512 whereby each node in the tree structure can have up to a maximum of N child nodes. In at least one embodiment, the tree structure of MD pages can corresponds to a mapping structure used for mapping logical addresses to corresponding physical locations of content stored at corresponding Generally, the techniques herein can be used with any layered or hierarchical structure of MD pages.

Before describing in more detail the mapping information of MD pages that can be used in an at least one embodiment to map a logical address to a corresponding physical storage location or address, further details are described in connection with using a log for logging user or client operations, such as write I/Os.

Consistent with other discussion herein, the log can be used to optimize write operation latency. Generally, the write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse. The write operation can be recorded in the log in any suitable manner and can include, for example, recording a target logical address to which the write operation is directed and recording the data written to the target logical address by the write operation.

In the log, each logged operation can be recorded in the next logically sequential record of the log. For example, a logged write I/O and write data (e.g., write I/O payload) can be recorded in a next logically sequential record of the log. The log can be circular in nature in that once a write operation is recorded in the last record of the log, recording of the next write proceeds with recording in the first record of the log.

The typical I/O pattern for the log as a result of recording write I/Os and possibly other information in successive consecutive log records includes logically sequential and logically contiguous writes (e.g., logically with respect to the logical offset or ordering within the log). Data can also be read from the log as needed (e.g., depending on the particular use or application of the log) so typical I/O patterns can also include reads. The log can have a physical storage layout corresponding to the sequential and contiguous order in which the data is written to the log. Thus, the log data can be written to sequential and consecutive physical storage locations in a manner corresponding to the logical sequential and contiguous order of the data in the log. Additional detail regarding use and implementation of the log in at least one embodiment in accordance with the techniques of the present disclosure is provided below.

Figure 2B:
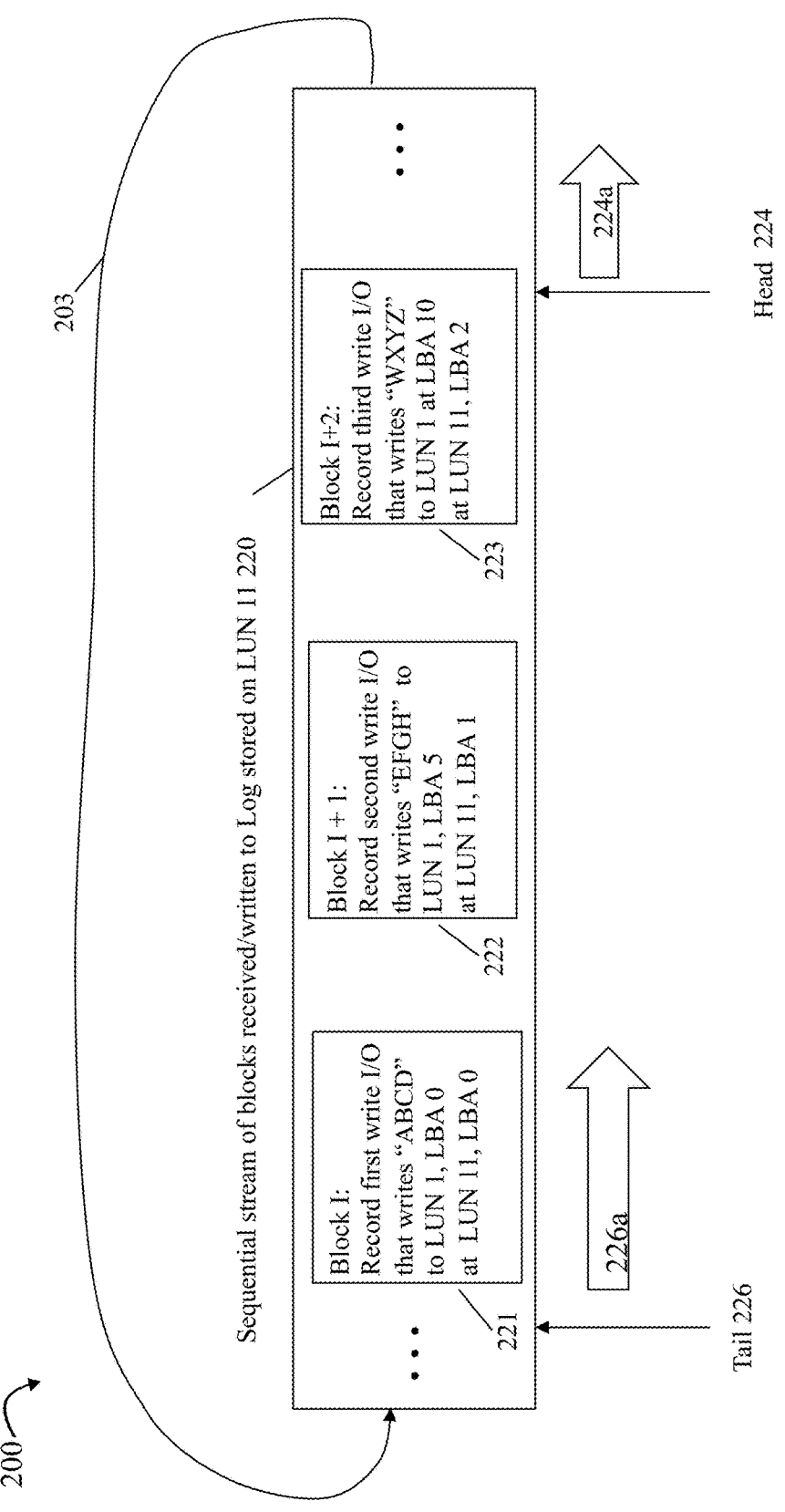
FIGS. 2B, 2C and 2D are examples illustrating use of a log or journal recording client operations in at least one embodiment in accordance with the techniques of the present disclosure.

Referring to FIG. 2B, shown is an example 200 illustrating a sequential stream 220 of operations or requests received that are written to a log in an embodiment in accordance with the techniques of the present disclosure. In this example, the log can be stored on the LUN 11 where logged operations or requests, such as write I/Os that write user data to a file, target LUN or other storage object, are recorded as records in the log. The element 220 includes information or records of the log for 3 write I/Os or updates which are recorded in the records or blocks I 221, I+1 222 and I+2 223 of the log (e.g., where I denotes an integer offset of a record or logical location in the log). The blocks I 221, I+1 222, and I+2 223 can be written sequentially in the foregoing order for processing in the data storage system. The block 221 can correspond to the record or block I of the log stored at LUN 11, LBA 0 that logs a first write I/O operation. The first write I/O operation can write "ABCD" to the target logical address LUN 1, LBA 0. The block 222 can correspond to the record or block I+1 of the log stored at LUN 11, LBA 1 that logs a second write I/O operation. The second write I/O operation can write "EFGH" to the target logical address LUN 1, LBA 5. The block 223 can correspond to the record or block I+2 of the log stored at LUN 11, LBA 2 that logs a third write I/O operation. The third write I/O operation can write "WXYZ" to the target logical address LUN 1, LBA 10. Thus, each of the foregoing 3 write I/O operations logged in 221, 222 and 223 write to 3 different logical target addresses or locations each denoted by a target LUN and logical offset on the target LUN. As illustrated in the FIG. 2B, the information recorded in each of the foregoing records or blocks 221, 222 and 223 of the log can include the target logical address to which data is written and the write data written to the target logical address.

The head pointer 224 can denote the next free record or block of the log used to record or log the next write I/O operation. The head pointer can be advanced 224a to the next record in the log as each next write I/O operation is recorded. When the head pointer 224 reaches the end of the log by writing to the last sequential block or record of the log, the head pointer can advance 203 to the first sequential block or record of the log in a circular manner and continue processing. The tail pointer 226 can denote the next record or block of a recorded write I/O operation in the log to be destaged and flushed from the log. Recorded or logged write I/Os of the log are processed and flushed whereby the recorded write I/O operation that writes to a target logical address or location (e.g., target LUN and offset) is read from the log and then executed or applied to a non-volatile BE PD location mapped to the target logical address (e.g., where the BE PD location stores the data content of the target logical address). Thus, as records are flushed from the log, the tail pointer 226 can logically advance 226a sequentially (e.g., advance to the right toward the head pointer and toward the end of the log) to a new tail position. Once a record or block of the log is flushed, the record or block is freed for reuse in recording another write I/O operation. When the tail pointer reaches the end of the log by flushing the last sequential block or record of the log, the tail pointer advances 203 to the first sequential block or record of the log in a circular manner and continue processing. Thus, the circular logical manner in which the records or blocks of the log are processed form a ring buffer in which the write I/Os are recorded.

When a write I/O operation writing user data to a target logical address is persistently recorded and stored in the non-volatile log, the write I/O operation is considered complete and can be acknowledged as complete to the host or other client originating the write I/O operation to reduce the write I/O latency and response time. The write I/O operation and write data are destaged at a later point in time during a flushing process that flushes a recorded write of the log to the BE non-volatile PDs, updates and writes any corresponding metadata for the flushed write I/O operation, and frees the record or block of the log (e.g., where the record or block logged the write I/O operation just flushed). The metadata updated as part of the flushing process for the target logical address of the write I/O operation can include mapping information as described elsewhere herein. The mapping information of the metadata for the target logical address can identify the physical address or location on provisioned physical storage on a non-volatile BE PD storing the data of the target logical address. The target logical address can be, for example, a logical address on a logical device, such as a LUN and offset or LBA on the LUN.

Figure 2C:
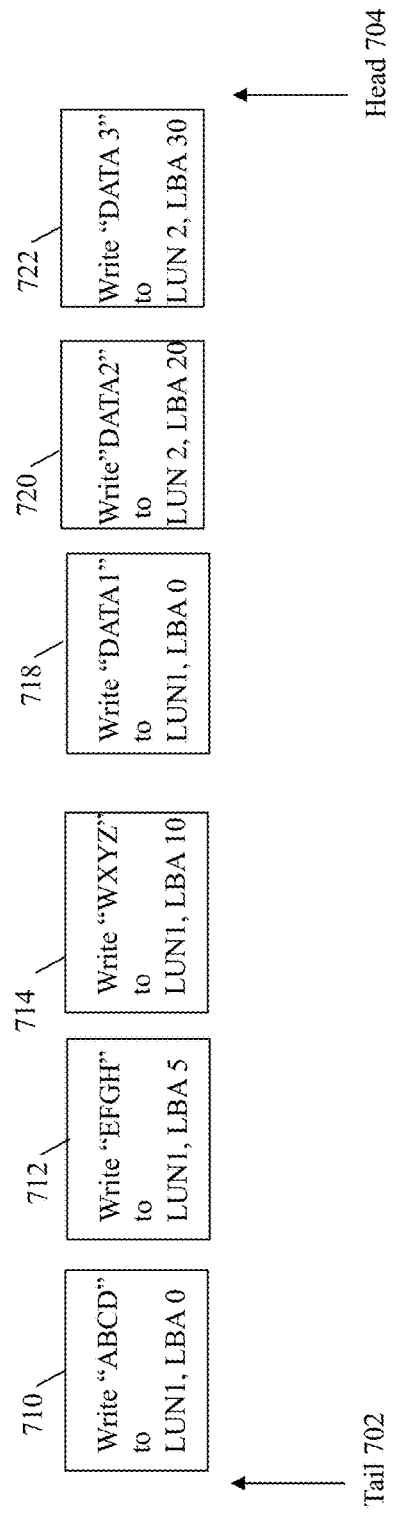

Referring to FIG. 2C, shown is an example of information that can be included in a log, such as a log of user or client write operations, in an embodiment in accordance with the techniques of the present disclosure.

The example 700 includes the head pointer 704 and the tail pointer 702. The elements 710, 712, 714, 718, 720 and 722 denote 6 records of the log for 6 write I/O operations recorded in the log. The element 710 is a log record for a write operation that writes "ABCD" to the LUN 1, LBA 0. The element 712 is a log record for a write operation that writes "EFGH" to the LUN 1, LBA 5. The element 714 is a log record for a write operation that writes "WXYZ" to the LUN 1, LBA 10. The element 718 is a log record for a write operation that writes "DATA1" to the LUN 1, LBA 0. The element 720 is a log record for a write operation that writes "DATA2" to the LUN 2, LBA 20. The element 722 is a log record for a write operation that writes "DATA3" to the LUN 2, LBA 30. As illustrated in FIG. 2C, the log records 710, 712, 714, 718, 720 and 722 can also record the write data (e.g., write I/O operation payload) written by the write operations. It should be noted that the log records 710, 712 and 714 of FIG. 2C correspond respectively to the log records 221, 222 and 223 of FIG. 2B.

The log can be flushed sequentially or in any suitable manner to maintain desired data consistency. In order to maintain data consistency when flushing the log, constraints can be placed on an order in which the records of the log are flushed or logically applied to the stored data while still allowing any desired optimizations. In some embodiments, portions of the log can be flushed in parallel in accordance with any necessary constraints needed in order to maintain data consistency. Such constraints can consider any possible data dependencies between logged writes (e.g., two logged writes that write to the same logical address) and other logged operations in order to ensure write order consistency.

Figure 2D:
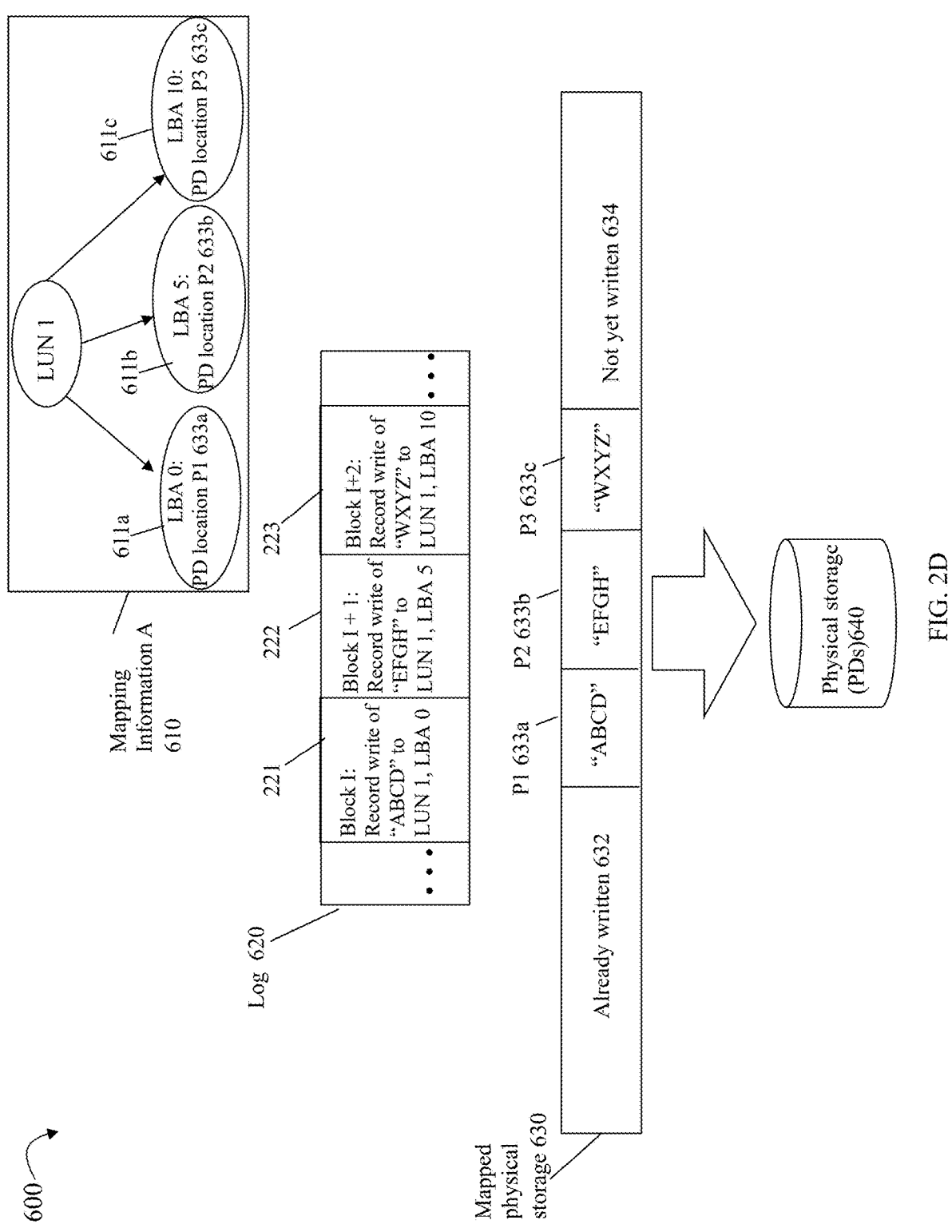

Referring to FIG. 2D, shown is an example 600 illustrating the flushing of logged writes and the physical data layout of user data on BE PDs in at least one embodiment in accordance with the techniques of the present disclosure. FIG. 2D includes the log 620, the mapping information A 610, and the physical storage (i.e., BE PDs) 640. The element 630 represents the physical layout of the user data as stored on the physical storage 640. The element 610 can represent the logical to physical storage mapping information A 610 created for 3 write I/O operations recorded in the log records or blocks 221, 222 and 223.

The mapping information A 610 includes the elements 611a-c denoting the mapping information, respectively, for the 3 target logical address of the 3 recorded write I/O operations in the log records 221, 222, and 223. The element 611a of the mapping information denotes the mapping information for the target logical address LUNI, LBA 0 of the block 221 of the log 620. In particular, the block 221 and mapping information 611a indicate that the user data "ABCD" written to LUN 1, LBA 0 is stored at the physical location (PD location) P1 633a on the physical storage 640. The element 611b of the mapping information denotes the mapping information for the target logical address LUNI, LBA 5 of the block 222 of the log 620. In particular, the block 222 and mapping information 611b indicate that the user data "EFGH" written to LUN 1, LBA 5 is stored at the physical location (PD location) P2 633b on the physical storage 640. The element 611c of the mapping information denotes the mapping information for the target logical address LUN 1, LBA 10 of the block 223 of the log 620. In particular, the block 223 and mapping information 611 indicate that the user data "WXYZ" written to LUN 1, LBA 10 is stored at the physical location (PD location) P3 633c on the physical storage 640.

The mapped physical storage 630 illustrates the sequential contiguous manner in which user data can be stored and written to the physical storage 640 as the log records or blocks are flushed. In this example, the records of the log 620 can be flushed and processing sequentially (e.g., such as described in connection with FIG. 2B) and the user data of the logged writes can be sequentially written to the mapped physical storage 630 as the records of the log are sequentially processed. As the user data pages of the logged writes to the target logical addresses are written out to sequential physical locations on the mapped physical storage 630, corresponding mapping information for the target logical addresses can be updated. The user data of the logged writes can be written to mapped physical storage sequentially as follows: 632, 633a, 633b, 633c and 634. The element 632 denotes the physical locations of the user data written and stored on the BE PDs for the log records processed prior to the block or record 221. The element 633a denotes the PD location P of the user data "ABCD" stored at LUN 1, LBA 1. The element 633b denotes the PD location P2 of the user data "EFGH" stored at LUN 1, LBA 5. The element 633c denotes the PD location P3 of the user data "WXYZ" stored at LUN 1, LBA 10. The element 634 denotes the physical locations of the user data written and stored on the BE PDs for the log records processed after the block or record 223.

In one aspect, the data layout (e.g., format or structure) of the log-based data of the log 620 as stored on non-volatile storage can also be physically sequential and contiguous where the non-volatile storage used for the log can be viewed logically as one large log having data that is laid out sequentially in the order it is written to the log.

The data layout of the user data as stored on the BE PDs can also be physically sequential and contiguous. As log records of the log 620 are flushed, the user data written by each flushed log record can be stored at the next sequential physical location on the BE PDs. Thus, flushing the log can result in writing user data pages or blocks to sequential consecutive physical locations on the BE PDs. In some embodiments, multiple logged writes can be flushed in parallel as a larger chunk to the next sequential chunk or portion of the mapped physical storage 630.

Consistent with other discussion herein, the mapped physical storage 630 can correspond to the BE PDs providing BE non-volatile storage used for persistently storing user data as well as metadata, such as the mapping information. With a log-structured system as discussed herein, as recorded writes in the log are processed, the data written by the writes can be written to new physical storage locations on the BE PDs.

In at least one embodiment, different commands or operations can be supported for writing or storing content to target logical addresses, where such write commands or operations can be recorded in the log. As discussed above, the commands can include host write I/O operations that are stored in the log and then flushed for further processing from the log. In at least one embodiment, the commands can include offload copy operations such as the XCOPY or extended copy operation or command.

The XCOPY or extended copy command can more generally denote an offload copy operation performed internally within the storage system where the source and destination or target of the copy can be within the same storage system or appliance. At least initially after performing the XCOPY operation, the source and target or destination of the XCOPY operation include the same content or data, where content is copied from the source to the target or destination. The XCOPY command can be issued, for example, from a host to the storage system to request that the storage system copy content from a source to a target location where both the source and target locations are in the storage system. In this manner, data to be written is not sent over a connection from the host to the storage system but rather copied internally by the storage system.

In at least one embodiment, the XCOPY command to copy content from a source logical address LA1 to a target logical address LA2, can include acquiring a read or shared lock on LA1 and a write or exclusive lock on LA2. In at least one embodiment of a system with multiple nodes where each of the multiple nodes reads content from the same source LA1 to copy data to a different corresponding target logical address, additional overhead can be incurred in connection with internode communication for locking to synchronize access to LA1 for multiple reader nodes.

In at least one embodiment, the XCOPY command, or more generally offload copy commands or operations, can be recorded in the log and subsequently flushed from the log in a manner similar to that as discussed above where mapping information of metadata pages can be created and/or updated to map target logical addresses to corresponding physical storage locations of content stored at the target logical addresses. Similar to a write I/O as noted above, most of the work for the XCOPY command can be performed when the XCOPY command is flushed from the log. In at least one embodiment, when the XCOPY command of the log is flushed, processing can include creating corresponding mapping information of metadata pages to map target logical addresses to the same stored content as corresponding source logical addresses.

In at least one embodiment, XCOPY can be implemented by reading the source content from source logical addresses and writing the content to corresponding target logical addresses. In at least one embodiment, deduplication can be performed to avoid consuming additional storage. As a further optimization in at least one embodiment, XCOPY commands can be implemented using a metadata-copy operation instead of a full data-copy operation. Put another way, instead of reading and writing the actual data, flushing the XCOPY command from the log to store the source content from source logical addresses to corresponding target logical addresses can be performed as generally a metadata-copy operation instead of a full data-copy operation. Put another way in at least one embodiment, instead of reading and writing the data, mapping information corresponding to the target logical addresses of the XCOPY command can be updated and/or creating to map to the same content as the source logical addresses. In this manner in at least one embodiment, XCOPY commands flushed from the log can have corresponding target logical addresses associated with corresponding source content of corresponding source logical addresses without actually writing any data to the drives. Thus in at least one embodiment, XCOPY can be implemented by copying or duplicating relevant portions of metadata of mapping information to map the target logical addresses to the same corresponding contents of corresponding source logical addresses.

In at least one embodiment, an XCOPY command or request can be partitioned into smaller segments of a segment size. In at least one embodiment, the segment size can be 1 MB. More generally, any suitable segment size can be used with the techniques of the present disclosure. In at least one embodiment, the segment size can generally be an integer multiple of the size of a cached data page. For example, in at least one embodiment, the cache can store data in pages where each page is a size of 4K. In at least one embodiment, the XCOPY segment size can be 1 MB and the data pages size of each cached data page can be 4K such that each XCOPY segment can correspond to 256 data pages, where each data page is 4K bytes in size. In at least one embodiment, XCOPY commands can be partitioned into subcommands or requests each for performing XCOPY processing or offload copying of a 1 MB segment or portion of content from a source location to a corresponding target location. In at least one embodiment, each of the 1 MB copy requests (sometimes referred to as XCOPY or offload copy requests) can be tracked at the 1 MB granularity by a data cache component in a hash table rather than, for example, tracking 256 data pages (where each data page can be 4K bytes) thereby significantly reducing the memory footprint in the cache. The foregoing can allow, for example, the cache to ingest TBs worth of XCOPY requests even though the cache size may be much smaller such as, for example, only 10s of GBs.

As noted above in at least one embodiment, the XCOPY command can be persistently recorded in the log as a copy request that is later flushed from the log. When the XCOPY command is flushed from the log, flush processing can include copying of the mapping metadata corresponding to the source offset or logical address to the corresponding target or destination offset or logical address. In at least one embodiment, the foregoing can be performed by creating and/or updating a few metadata pages as opposed to reading content of the entire source range and writing the content back out to the target or destination range. The foregoing approach in at least one embodiment allows the data path efficiently to handle bursts of XCOPY requests and achieve very high XCOPY bandwidth without needing large amounts of memory. The foregoing approach is bound mostly by CPU processing power. Increasing the CPU power (alternatively further optimizing the CPU utilization for XCOPY) can further improve XCOPY bandwidth.

In at least one embodiment, a dedicated set of CPU cores of each node can be specified as dedicated to servicing host or more generally client I/Os or client commands and operations that read and/or write content. The foregoing dedicated set of CPU cores can be referred to as I/O cores. In at least one embodiment, the set of I/O cores can be used to service host (e.g., client) read and write I/Os and commands including, the extended copy operations or commands such as the XCOPY command. To use these I/O cores efficiently and to keep the load balanced, the data path can distribute the host I/Os or commands across these cores in a round-robin manner. The foregoing distribution can also take into account, for example, the load on the system from background operations or BG operations to maintain predictable latency for host I/Os. In at least one embodiment, such BG operations can include flushing of the log and processing recorded commands flushed from the log as discussed above. XCOPY requests can be treated similarly though they can differ in locality distribution from other kinds of host or client I/Os.

In at least one embodiment of a storage system, typical use cases that can be associated with XCOPY requests are when new VMs are deployed or VMs are being migrated. These XCOPY commands or requests can be performed in bulk (e.g., deployment of several VMs from a template) and can have a 1-to-many aspect. For example, one or more commands can be issued to the storage system in connection with creating 100 new VMs from a template. The template can have a corresponding source location on the storage system. For the 100 VMs, the storage system can receive 100 corresponding XCOPY requests to create data for the 100 VMs where such 100 copies of VM data is stored on the storage system. Each of the 100 XCOPY requests can request to copy the template content from a source location to a corresponding target location corresponding to the VM to be created. In this manner, the 100 XCOPY requests can have the same source (e.g., of the template) but where each of the 100 XCOPY requests can have a different target location corresponding to different one of the 100 VMs.

In at least one embodiment, the 1 MB segments of the foregoing XCOPY requests can be distributed across the set of dedicated I/O cores. XCOPY requests with the same source offset but different destinations can arrive in the cache simultaneously and result in increased contention for various resources. For example, such XCOPY requests can contend for the same hash buckets and same pages in cache. Such contention can reduce the XCOPY throughput. Additionally, in at least one embodiment, the cache can manage stored data pages based, at least in part, on an LRU or least recently used policy. With an LRU policy, pages can be selected for eviction or removal from cache based, at least in part, on when the cached data page was most recently referenced. With an LRU policy, the least recently used pages can be selected for eviction or removal from cache before other data pages that are more recently used or referenced. In at least one embodiment, the LRU information used for pages in cache can be maintained on per-core LRU queues to reduce contention. In at least one embodiment, LRU information for a page in cache can be placed on the LRU queue of the corresponding particular core that last or most recently accessed the page, where the corresponding core can also handle updating the LRU information as needed while on the queue of the corresponding core. Due to foregoing in at least one embodiment, even if multiple XCOPY requests don't arrive at the cache simultaneously, multiple XCOPY requests accessing the same source location or logical addresses can still cause contention with resources such as the hash table and/or LRU queues. With the LRU queues, the LRU information of source pages can be moved between a first LRU queue of one core to a second LRU queue of another core, thereby requiring synchronization such as locking both the first and second LRU queues to reassign or move LRU information between the LRU queues.

In at least one embodiment, techniques of the present disclosure can improve the locality of XCOPY request segments processed by the various CPU cores to thereby improve XCOPY performance and system performance. The techniques of the present disclosure affine processing of XCOPY requests segments to CPU cores based, at least in part, on the corresponding source logical addresses of the segments. The techniques of the present disclosure manage how the XCOPY segments are distributed over or among the CPU cores. In at least one embodiment, the CPU cores over which the XCOPY segments are distributed can be those of the I/O core set of cores dedicated to serving host or client I/Os.

In at least one embodiment, the techniques of the present disclosure can provide for dynamically switching the particular CPU core affined to servicing a particular XCOPY segment having a corresponding starting source logical address based, at least on part, on one or more remapping conditions or criteria. In at least one embodiment, the one or more remapping conditions can provide for switching the particular CPU core affined to the particular XCOPY segment if the currently affined CPU core is saturated, busy, and/or is executing a task, thread or process having a first priority that is higher than a particular priority associated with XCOPY processing.

In at least one embodiment, the techniques of the present disclosure provide for improved CPU efficiency of XCOPY commands and improving the XCOPY bandwidth that can be achieved.

In at least one embodiment by affining processing of XCOPY request segments based on the corresponding starting source logical addresses: i) lock contention between LRU queues noted above can be reduced; ii) CPU contention and CPU processing time of XCOPY requests for the same segment of source pages can be reduced, for example, by reducing lock contention for hash tablet buckets and structures representing the source pages; and iii) the locality of different data cache structures in the CPU lower level caches (e.g., on chip CPU caches) can be improved.

The foregoing and other aspects of the techniques of the present disclosure are discussed in more detail in the following paragraphs.

In at least one embodiment, each XCOPY request that copies content from a source location or logical address to a target location or logical address can be partitioned into a number of aligned segments each of a defined segment size, such as 1 MB. Thus in at least one embodiment, each XCOPY segment of a defined size, such as 1 MB or other suitable size, can have a corresponding starting address that is aligned on a 1 MB boundary or granularity. In at least one embodiment where an XCOPY request can have unaligned portions or pieces at the beginning and/or end of the source location, such unaligned portions can be handled by reading the unaligned portion from a source address and writing the unaligned portion to a corresponding target address. Thus in such an embodiment, the source content of the source location or logical address of an XCOPY request can generally include i) an optional beginning unaligned portion; ii) an optional ending unaligned portion; and iii) one or more aligned 1 MB segments, where the unaligned beginning and/or ending portions can vary based on the specified source location or logical address. The techniques of the present disclosure further specify processing that can be performed in connection with the aligned segments of XCOPY requests.

To increase the locality within the data cache in at least one embodiment, the techniques of the present disclosure provide for assigning and processing XCOPY segments such that XCOPY segments with the same starting logical address can be assigned and processed by the same CPU core. In this manner, the same source pages of XCOPY requests can be accessed on the same core. In at least one embodiment, a scheduler that distributes or assigns XCOPY segments across CPU cores can provide for assigning the same XCOPY segment, which can be a source segment of multiple different XCOPY requests, to the same CPU core. In at least one embodiment, the scheduler can perform such assignment to a CPU core based, at least in part, on the corresponding starting logical address or offset of each segment of an XCOPY request. For example, assume that 3 XCOPY requests are received at the storage system where all 3 XCOPY requests copy source content from a source location and where the source content is 3 MB aligned segments—SEG1 with starting address LA1, SEG2 with starting address LA2, and SEG3 with starting address LA3. The scheduler can perform processing that i) assigns SEG1 of each 3 XCOPY requests to a first CPU core, CORE X; assigns SEG2 of each 3 XCOPY requests to a second CPU core, CORE Y; and iii) assigns SEG3 of each 3 XCOPY requests to a third core, CORE Z.

In at least one embodiment, a CPU core index can be computed based, at least in part, on the starting logical address LA of an XCOPY segment. The CPU core index can be an index or identifier uniquely identifying one of N cores that can be assigned XCOPY requests for processing whereby the assigned core copies the assigned source segment to a corresponding target logical address or location. For example in at least one embodiment, a CPU core index for LA of an XCOPY segment can be calculated as expressed in EQUATION 1 below:

$$\text{Index} = \text{LA MOD}(N * \text{segment size}) \qquad \text{EQUATION 1}$$

where:

Index denotes the CPU core index;

LA denotes the starting logical address of a segment of the source location of an XCOPY request;

N denotes the number of CPU cores in the I/O core set that can be assigned XCOPY segments for processing;

segment size denotes the defined segment size of each segment such as 1 MB;

MOD denotes the mathematical modulo function or modulus operation that returns the remainder of LA divided by a first quantity, where the first quantity is the mathematical product of N multiplied by the segment size (e.g., N*segment size).

In at least one embodiment, the CPU cores of the I/O core set can have corresponding indices or index values denoting a sequence of consecutive integers beginning with 0.

Consider an example where the storage system receives 3 XCOPY requests, R1, R2 and R3, each copying the same 12 MB of source content from a source volume S1 from a source location or logical address of 0x2000000 (logical address in hexadecimal). The first XCOPY request R1 can copy the 12 MB of source content beginning with the source location 0x2000000 of S1 to a first target location 0x2000000 of a first target volume D1. The second XCOPY request R2 can copy the 12 MB of source content beginning with the source location 0x2000000 of S1 to a second target location 0x4000000 of a second target volume D2. The third XCOPY request R2 can copy the 12 MB of source content beginning with the source location 0x2000000 of S1 to a third target location 0x10300000 of a third target volume D3. Assume further that the I/O core set of cores that can be assigned and process XCOPY requests is 10 cores with corresponding core indices C0-C9 (e.g., indices 0-9).

Referring to FIG. 3A, shown is an example 300 of a core mapping that can be determined based on EQUATION 1 for each of the 12 segments of the source location of the 3 XCOPY requests R1-R3 noted above in at least one embodiment.

The table 300 includes the following columns: source segment number or identifier (ID) 302a, starting logical addresses of source segments 302b, and core indices 302c. The table 300 includes rows 304a-1 for the 12 corresponding segments, where each of the rows 304a-1 denotes a computed CPU core index and thus CPU core mapping for a corresponding starting logical address of a corresponding XCOPY segment.

The row 304a indicates that segment 1 (302a) of the source location has a starting logical address 0x2000000 (302b) and a computed core index of 2 based on EQUATION 1 denoting core C2.

The row 304b indicates that segment 2 (302a) of the source location has a starting logical address 0x2100000 (302b) and a computed core index of 3 based on EQUATION 1 denoting core C3.

The row 304c indicates that segment 3 (302a) of the source location has a starting logical address 0x2200000 (302b) and a computed core index of 4 based on EQUATION 1 denoting core C4.

The row 304d indicates that segment 4 (302a) of the source location has a starting logical address 0x2300000 (302b) and a computed core index of 5 based on EQUATION 1 denoting core C5.

The row 304e indicates that segment 5 (302a) of the source location has a starting logical address 0x2400000 (302b) and a computed core index of 6 based on EQUATION 1 denoting core C6.

The row 304f indicates that segment 6 (302a) of the source location has a starting logical address 0x2500000 (302b) and a computed core index of 7 based on EQUATION 1 denoting core C7.

The row 304g indicates that segment 7 (302a) of the source location has a starting logical address 0x2600000 (302b) and a computed core index of 8 based on EQUATION 1 denoting core C8.

The row 304h indicates that segment 8 (302a) of the source location has a starting logical address 0x2700000 (302b) and a computed core index of 9 based on EQUATION 1 denoting core C9.

The row 304i indicates that segment 9 (302a) of the source location has a starting logical address 0x2800000 (302b) and a computed core index of 0 based on EQUATION 1 denoting core C0.

The row 304j indicates that segment 10 (302a) of the source location has a starting logical address 0x2900000 (302b) and a computed core index of 1 based on EQUATION 1 denoting core C1.

The row 304*k* indicates that segment 11 (302*a*) of the source location has a starting logical address 0x2A00000 (302*b*) and a computed core index of 2 based on EQUATION 1 denoting core C2.

The row 304*l* indicates that segment 12 (302*a*) of the source location has a starting logical address 0x2B00000 (302*b*) and a computed core index of 3 based on EQUATION 1 denoting core C3.

The table 300 can denote a CPU core mapping for XCOPY segment starting logical addresses at a first point in time T1. The XCOPY requests R1, R2 and R3 can be received and processed in the foregoing order. The CPU cores of 302*c* can be computed based on EQUATION 1 for XCOPY request R1. Subsequently, processing can be performed for requests R2 and R3 using the existing mapping denoted by the table 300 at time T1. In this manner, the same source segment, such as segment 1, of each of the XCOPY requests R1-R3 can be processed by the same CPU Core C2 (denoted by row 304*a*); the same source segment 2 of XCOPY requests R1-R3 can be processed by the same CPU core C3 (denoted by the row 304*b*), and so on, for all 12 segments of the source location of the 3 XCOPY requests R1-R3.

The foregoing CPU core mapping based on EQUATION 1 for all XCOPY request segments and corresponding segment starting addresses can result in some CPU cores being used more than others for XCOPY segment processing More generally, the foregoing CPU core mapping based on EQUATION 1 for all XCOPY request segments and corresponding segment starting addresses, along with possibly other workloads, can result in a workload imbalance among the cores of the I/O core set and/or can result in one or more of the CPU cores being busy thereby triggering reassignment or remapping to one or more corresponding alternative cores. Yet more generally in at least one embodiment, one or more remapping conditions or criteria (sometimes referred to as conditions or criteria) can be specified that indicate whether or not to remap a particular core for a corresponding segment starting logical address to another different core for processing. In at least one embodiment, such remapping conditions or criteria can be used in connection with determining whether or not to assign an XCOPY segment to a CPU core based on a computed core index. In at least one embodiment where there is an existing core mapping for a segment starting logical address, such remapping conditions or criteria can be used in connection with determining whether or not to assign an XCOPY segment to a CPU core based on the existing core mapping or otherwise determine a different alternative CPU core index of an alternative CPU core to be assigned the XCOPY segment for processing. In at least one embodiment if an alternative CPU core is assigned the XCOPY segment having the segment starting logical address, any existing corresponding mapping can be updated to the alternative CPU core so that subsequent XCOPY requests for the same XCOPY segment can now be assigned to the alternative CPU core. The one or more remapping conditions or criteria are discussed in more detail below.

Continuing with the above example, assume now that at time T2 subsequent to T1, a fourth XCOPY request R4 is received to copy the same source content of 12 MB segments beginning with the source location 0x2000000 of the source volume S1 to a fourth target location 0x2000000 of a fourth target volume D4. At time T2, processing can be performed to partition the source location into 12 MB aligned segments as noted above. For the first segment 1 having the starting logical address 0x2000000, processing can determine whether there is an existing core mapping. In this example with reference to FIG. 3A, processing can determine that entry 304*a* of the table 300 is the existing core mapping for segment 1 denoting CPU core C2. However, based on the remapping conditions or criteria, processing can further determine that C2 should not be assigned segment 1 with the starting logical address of 0x2000000. Rather, based on the remapping criteria or conditions and/or other criteria for alternative core selection, processing can determine that XCOPY segment 1 of R4 should be assigned to core C8 for processing to copy to a corresponding target location on D4. In this case, i) the CPU core of 302*c* of the existing mapping of entry 304*a* can be updated from C2 to C8; and ii) XCOPY segment 1 of R4 can assigned to C8.

For R4 and the second segment 2 having the starting logical address 0x3000000, processing can determine whether there is an existing core mapping. In this example with reference to FIG. 3A, processing can determine that entry 304*b* of the table 300 is the existing core mapping for segment 3 denoting CPU core C3. However, based on the remapping conditions or criteria, processing can further determine that C3 should not be assigned segment 2 with the starting logical address of 0x3000000. Rather, based on the remapping criteria or conditions and/or other criteria for alternative core selection, processing can determine that XCOPY segment 2 of R4 should be assigned to core C9 for processing to copy to a corresponding target location on D4. In this case, i) the CPU core of 302*c* of the existing mapping of entry 304*b* can be updated from C3 to C9; and ii) XCOPY segment 2 of R4 can assigned to C9.

For the remaining segments 3-12 of R4 based on the remapping criteria, processing can determine that the currently affined CPU cores of corresponding existing core mappings 304*c*-1 can be assigned corresponding segments 3-12 of R4. In this case, the existing core mappings can be utilized and no further updated is needed to the specified CPU core indices of such mapping 304*c*-1.

Referring to FIG. 3B, shown is an example 350 of the updated CPU core mappings for the 12 segments beginning with the source location 0x2000000 of the source volume S1 after processing XCOPY request R4 in at least one embodiment. Thus table 350 denotes the CPU core mappings at point in time T2 after processing R4.

The table 350 includes columns 352*a-c* corresponding respectively to columns 302*a-c* of FIG. 3A. The table 350 includes rows 354*a*-1 denoting the core mapping respectively for segments 1-12 beginning with the source location 0x2000000 of the source volume S1, where such rows 354*a-b* have been updated as discussed above, and where rows 354*c*-1 have not been updated. In particular element 356*a* denotes the update to row 354*a* for the updated core mapping for XCOPY segment 1 with the starting address of 0x2000000 of the source volume S1 whereby the core mapping is updated to denote core C8 rather than C2 (e.g., as in row 304*a* of FIG. 3A). In particular element 356*b* denotes the update to row 354*b* for the updated core mapping for XCOPY segment 2 with the starting address of 0x2100000 of the source volume S1 whereby the core mapping is updated to denote core C9 rather than C3 (e.g., as in row 304*b* of FIG. 3A).

At a time T3 subsequent to T2, a fifth XCOPY request R5 can be received and processing where R5 is yet another XCOPY request to copy the same source content of 12 MB segments beginning with the source location 0x2000000 of the source volume S1 to a fifth target location 0x3000000 of a fifth target volume D5. In connection with R5, processing can utilize the updated core mappings of 350 to assign corresponding XCOPY segments to corresponding affined CPU cores. In this example with R5, such processing can determine, based on the remapping conditions or criteria, that such existing core mappings can be utilized to assign XCOPY segments for processing without further selecting an alternative core.

In at least one embodiment, before each XCOPY segment is assigned to a first core for processing based on a computed core index or an existing mapping, the remapping criteria or conditions can be evaluated to determine whether to use the first core, or otherwise select an alternative core to be assigned the XCOPY segment. In at least one embodiment, each time an alternative core is assigned a segment rather than a current core denoted by an existing core mapping, the core mapping for the segment can be updated to identify the alternative core. In this manner, a next subsequent XCOPY request for the same source segment can be assigned to the core denoted by the updated core mapping.

What will now be described in more detail are the one or more remapping conditions or criteria (mentioned above) that can be used in at least one embodiment in accordance with the techniques of the present disclosure.

The one or more remapping conditions or criteria (sometimes simply referred to as conditions or criteria) can trigger remapping or reassigning a computed core to another second core for a corresponding segment having a corresponding starting logical address. In at least one embodiment if there is an existing core mapping for a starting logical address, the one or more remapping conditions or criteria can trigger further remapping, reassigning or updating the existing core mapping for the corresponding starting logical address to another core.

More generally, the one or more remapping conditions or criteria can be applied to a selected candidate core to be assigned a segment for XCOPY processing, where the segment has a corresponding starting logical address, to determine whether the selected candidate core needs to be remapped or reassigned to another core for XCOPY processing, or otherwise whether the segment can be assigned to the selected candidate core for XCOPY processing. If the remapping conditions or criteria indicate to remap or reassign the candidate core to another core, the corresponding core mapping can also be accordingly updated.

In at least one embodiment, processes, tasks or threads that execute on cores can be assigned relative priorities. For example, the XCOPY command processing can be assigned a first priority P1. A first core CJ corresponding to a computed core index J can be currently executing a thread or performing processing that has a second priority P2. In at least one embodiment, the higher the priority associated with a task, thread or processing, the more important or critical the task, thread or processing. If P2 denotes a higher priority than P1, then it indicates that core CJ is currently executing a task that has a higher priority than the XCOPY processing. In at least one embodiment, a condition can specify that if CJ as identified by the computed core index is performing processing for a task having a priority P2 that's higher than priority P1 of the XCOPY command processing, then the core CJ can be determined as busy and another core can be selected for performing XCOPY command processing of the current segment. In this manner, for a specified starting logical address LA1 of a source segment SEG1 and its corresponding computed core index J and corresponding core CJ, the computed core index can be remapped to another second core index K of another alternative second core CK, where the current segment SEG1 can be assigned to CK for XCOPY processing. Additionally, the core mapping for SEG1 having starting logical address LA1 can be updated to map to CK so that the next XCOPY command request for SEG1 having LA1 can be assigned to CK for processing rather than CJ (e.g., where CJ can be based on the computed core index J).

In at least one embodiment, a condition can specify that if the currently executing task of a core, such as CJ, has priority P2 that is a higher priority than P1 of the XCOPY command processing, the core such as CJ can be determined as busy and can be remapped to another second core such as CK noted above, where the XCOPY command processing for the segment can be assigned or issued to the second core CK. Additionally, the corresponding core mapping can also be accordingly updated. If the core CJ is not busy based on the condition or criterion, then the segment can be assigned to the core CJ and the core mapping for SEG1 having a corresponding starting logical address can accordingly map SEG1 to CJ.

In at least one embodiment, a condition can be specified that indicates a core, such as CJ, is busy if one or more other tasks or operations with a higher priority than the XCOPY command processing are currently executing on the particular core. The condition can indicate that if the particular core such as CJ is determined as busy, the core CJ can be remapped to another second core such as CK noted above, where i) the XCOPY command processing for the segment can be assigned or issued to the second core CK, and ii) the corresponding core mapping can also be accordingly updated. In at least one embodiment, the one or more tasks having a higher priority P2 than P1 of the XCOPY command processing can include one or more background (BG) operations or tasks. In at least one embodiment, the BG operations can include flushing of a log of recorded operations including, for example, client or host writes, XCOPY commands, and possibly other commands or operations. Thus in at least one embodiment, if the core CJ is performing flush processing and/or one or more other BG operations, the segment can be assigned or issued to another core CK. Additionally, the corresponding core mapping can also be accordingly updated.

In at least one embodiment, a condition can be specified that indicates a core, such as CJ, is busy if CJ has a utilization above a threshold level. If CJ has a utilization above the threshold level, the condition can further specify that the segment can be assigned or issued to another core CK that has a corresponding utilization below the threshold level. Additionally, the corresponding core mapping can also be accordingly updated.

In at least one embodiment, a condition can be specified that indicates generally not to assign a segment to a core, such as CJ, that is busy such as with a workload above a specified threshold, and alternatively to assign the segment to a core that is determined as not busy with a workload at or below the specified threshold. In at least one embodiment, the busyness or workload of each core can be determined in any suitable manner using any one or more metrics. For example, in at least one embodiment, the workload of a core can be determined based, at least in part, on any one or more of: i) the current utilization of the core; ii) the queue length of pending or incomplete jobs, tasks or threads assigned to the core where each item in the queue denotes a job, task or thread scheduled for execution on the core but whose processing is not yet complete; iii) the average I/O latency of the core; and/or iv) the particular pending or incomplete jobs, tasks or threads in the queue of those assigned to the core and an estimated amount of time expected to complete each assigned incomplete job, task or thread of the core. For example, in at least one embodiment, the condition can specify one or more of the following: i) that CJ can be assigned the segment if CJ's current utilization is below a threshold level; ii) that CJ can be assigned the segment if CJ's average I/O latency is below a threshold level; iii) that CJ can be assigned the segment if CJ's queue length is below a threshold level number of queued items (e.g., number of incomplete jobs, tasks or threads assigned to CJ); and/or iv) that CJ can be assigned the segment if the amount of time expected to complete CJ's currently queued assigned incomplete jobs is less than a threshold. In connection with iv, the amount of time expected to complete CJ's queued assigned incomplete jobs can be determined based, at least in part, on the particular pending or incomplete jobs, tasks or threads in the queue of those assigned to the core and an estimated amount of time expected to complete each assigned incomplete job, task or thread of the core.

In at least one embodiment, if the one or more remapping conditions or criteria indicate that a segment should not be assigned to a core, such as CJ, then an alternative core may be selected from the remaining cores of the I/O core set. In at least one embodiment, the remaining cores can be traversed and evaluated where the alternative core can also be selected from the remaining cores based on the one or more remapping conditions or criteria. For example assume that there are 10 cores C0-C9 where the core CJ=C0 is running flush processing. The criteria can include a condition that specifies the segment is not sent to C0 for processing if C0 is running flush processing. As a result, an alternative core can be determined. In at least one embodiment, the remaining cores C1-C9 can be evaluated based on increasing core indices (e.g., C1-C9) to determine the first remaining core that is not performing flush processing. In this example, assume that processing determines C1 and C2 are also performing flush processing. As a result, C1 and C2 are not selected. Subsequently, C3 can be evaluated where it is determined that C2 is not performing flush processing. Generally, the one or more remapping conditions can indicate that C3 can be selected and sent the segment for XCOPY processing.

In at least one embodiment, the one or more remapping conditions can specify that cores of the I/O core set which are performing flush processing should not be assigned a segment for XCOPY processing. As a result, remaining cores of the I/O core set can be traversed in a round robin manner to select one of the remaining cores to be assigned the segment for XCOPY processing, where the selected remaining core is not performing flush processing. In at least one embodiment, the remaining cores of the I/O core set can be those that ingest or receive I/O commands from a host. Put another way in at least one embodiment, the remaining cores of the I/O core set can be designated as cores that serve as front end or FE processing cores for FE ports of the storage system. Such FE processing cores can, for example, service read I/Os, write I/Os and XCOPY commands. For write I/Os and XCOPY commands the FE processing cores can record the commands in the log and then return an acknowledgement to the requesting host or client. Thus in at least one embodiment, a first portion of the I/O core set can be performing flushing and a second remaining portion of the I/O core set can be ingesting received I/Os and commands from hosts, where the number of cores in the foregoing first and second portions can vary dynamically as needed depending on the I/O workload and associated characteristics. In at least one embodiment, an alternative core can be selected from the second set in a round robin manner. In at least one embodiment, cores of the I/O core set can perform FE processing and also flush processing. At a point in time, a specified number of the cores can perform flush processing as may be needed based on the workload and workload characteristics of the system.

In at least one embodiment, a condition can be specified that indicates the alternative core selected can be an idle core, if any, of the remaining cores such as C1-C9.

In at least one embodiment, a condition can be specified that the alternative core selected can be one of the remaining cores which i) is not performing flushing and ii) has the minimum workload of all remaining cores. For example, if the remaining cores are C1-C9 where C3 has the minimum workload of C1-C9, then the segment can be assigned or sent to C3 for XCOPY processing. The busyness or workload of each core can be determined in any suitable manner using any one or more metrics. For example, in at least one embodiment, the workload of a core can be determined based, at least in part, on any one or more of: the current utilization of the core; the queue length of pending or incomplete jobs, tasks or threads assigned to the core where each item in the queue denotes a job, task or thread scheduled for execution on the core but whose processing is not yet complete; the average I/O latency of the core; and/or the particular pending or incomplete jobs, tasks or threads in the queue of those assigned to the core and an estimated amount of time expected to complete each assigned incomplete job, task or thread of the core. For example, in at least one embodiment, the alternative core selected can have the minimum average I/O latency of all remaining cores that are not performing flush processing.

In at least one embodiment, a common use case of the techniques of the present disclosure can be in connection with multiple XCOPY requests each copying the same source content from the same source location to a different corresponding target location (that can vary with each XCOPY request). For example, the foregoing multiple XCOPY requests to copy a single source to multiple targets or destinations can be issued in connection with the deployment of multiple VMs from a template. In such a scenario in at least one embodiment, the XCOPY requests can be expected to be received at the storage system for processing relatively close to each other in time and thus within some defined time window W. Thus in at least one embodiment, the techniques of the present disclosure can provide for maintaining and using the core mapping information for segments of an XCOPY source location for an amount of time based, at least in part, on W. In at least one embodiment, the storage system can use any suitable technique to determine when the storage system has received multiple XCOPY requests that copy the same source location content to multiple different target or destination locations. In at least one embodiment, once the storage system has detected the foregoing multiple XCOPY requests with the same source and multiple destinations, the storage system can enable use of the techniques of the present disclosure where core mapping information for the source volume, and in particular the source location, can be maintained and utilized for a maximum specified time period.

In at least one embodiment, the techniques of the present disclosure can be enabled and utilized on a per volume basis where the volume is a source volume having the same source content copied to multiple destinations by multiple XCOPY requests. In at least one embodiment, each node of the system can individually determine or detect when the node itself is processing multiple XCOPY requests copying the same source content from the same source volume to multiple targets or destination locations. In at least one embodiment of a storage system with multiple nodes, the multiple XCOPY requests copying the same source content to multiple destinations can be serviced by more than a single node. For example consider a dual node system as in FIG. 2A, where the XCOPY requests R1, R2, R3 and R4 noted above can be serviced by node A and where the XCOPY request R5 can be serviced by node B. The storage system can detect the foregoing multiple XCOPY requests copying content from the same source (e.g., the same source volume and/or same source location) to different destinations by both nodes. In at least one embodiment, the storage system can detect the foregoing based on synchronization and locking performed between the nodes with respect to both nodes A and B having to access the source location of the source volume for read access to process one or more of the multiple XCOPY requests. In this manner, the storage system can detect when both nodes A and B request and hold a read lock on the source volume, and in particular, the source location of the source volume.

In at least one embodiment when i) a single node determines it is servicing multiple XCOPY requests copying the same source content of a source volume to multiple destinations, or ii) the system determines that both nodes hold a read lock on the same source volume, and/or in particular the same source location, the techniques of the present disclosure can be enabled and used when processing XCOPY requests for the source volume. In this manner, a system can utilize the techniques of the present disclosure to process XCOPY requests when enabled for a source volume and/or source location, or otherwise use an alternative technique to process XCOPY requests when not so enabled for a source volume and/or source location. As discussed above, the techniques of the present disclosure and processing such as described in FIGS. 3A-3B and 4A and 4B can be enabled on a per source volume and/or source location basis when the storage system detects it has received multiple XCOPY requests copying the same source content from the same source volume (or source location) to multiple destinations. Otherwise, the storage system can utilize an alternative technique to process XCOPY requests directed to a source volume and/or source location. In at least one embodiment, the alternative technique may assign or distribute XCOPY segments for processing to cores without regard for, and independent of, the core previously assigned the same XCOPY segment for processing. For example, in at least one embodiment, the alternative technique may distribute XCOPY segments for processing among cores of the I/O core set in a round robin manner without using core mappings as in FIGS. 3A and 3B.

Referring to FIGS. 4A, 4B, 5A and 5B shown are flowcharts of processing steps that can be performed in at least one embodiment in accordance with the techniques of the present disclosure. The flowcharts of FIGS. 4A, 4B, 5A and 5B summarize processing described above.

Figure 4A:
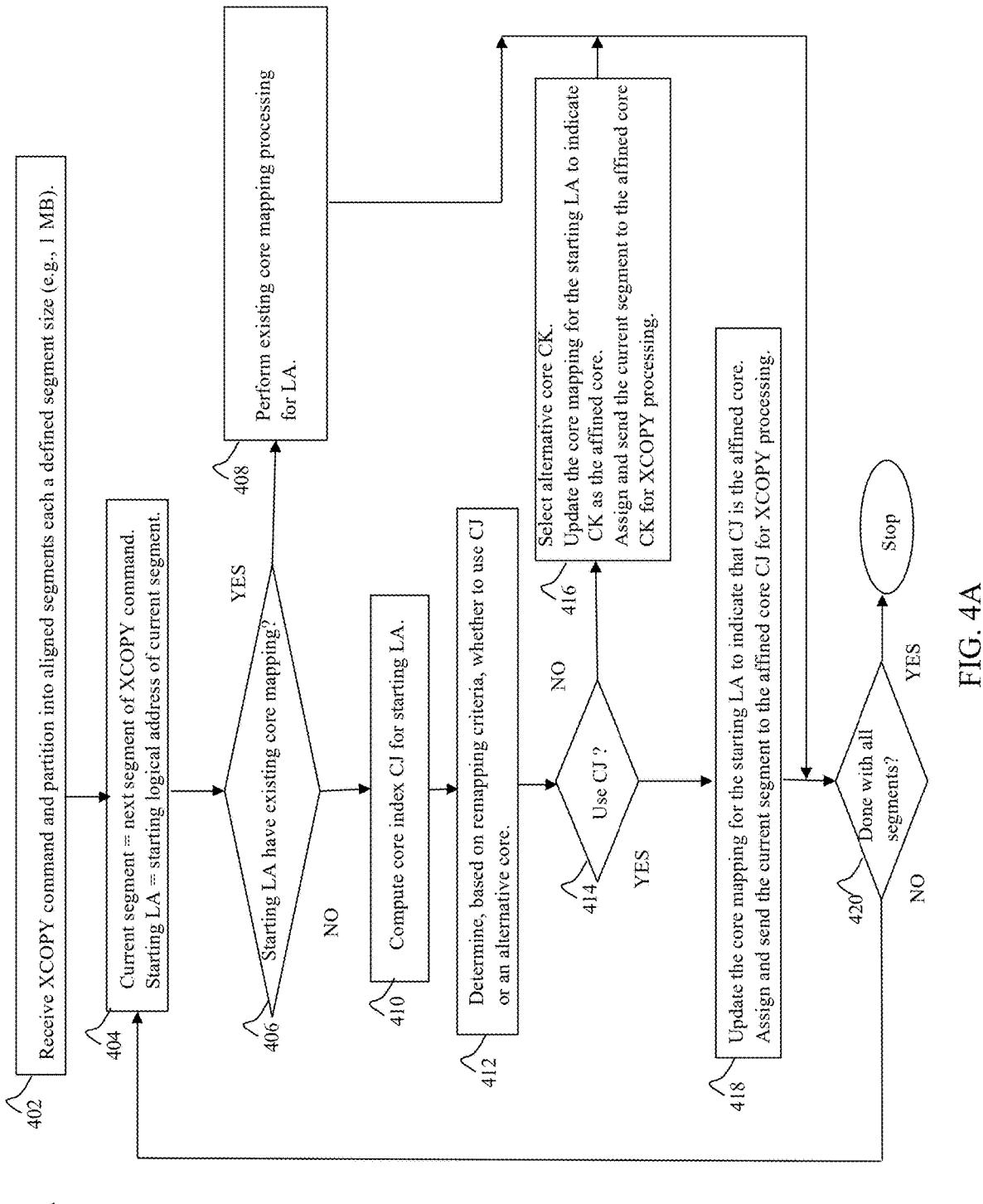

Referring to FIG. 4A, shown is a first flowchart 400 of processing steps that can be performed in at least one embodiment in accordance with the techniques of the present disclosure.

At the step 402, the storage system can receive an XCOPY command. The source content of the source location of the XCOPY command can be partitioned into aligned segments each a defined segment size (e.g., 1 MB). From the step 402, control proceeds to the step 404.

At the step 404, current segment can be assigned the next segment of the source location of the XCOPY command to be assigned to a core for processing. Starting LA can be assigned the starting logical address of the current segment. From the step 404, control proceeds to the step 406.

At the step 406, a determination is made as to whether there is an existing core mapping for the starting LA of the current segment. If the step 406 evaluates to yes, control proceeds to the step 408.

At the step 408, existing core mapping processing for the starting LA of the current segment can be performed. Additional details regarding step 408 in at least one embodiment are described in connection with FIG. 4B. From the step 408, control proceeds to the step 420.

If the step 406 evaluates to no, control proceeds to the step 410.

At the step 410, processing can compute the core index J for the CPU core CJ for the starting LA. The core index J, and thus CJ, can be determined, for example, using EQUATION 1 described above. From the step 410, control proceeds to the step 412.

At the step 412, processing can determine, based on remapping criteria, whether to use CJ or an alternative core. From the step 412, control proceeds to the step 414.

At the step 414, a determination is made as to whether to assign the current segment to CJ based on step 412.

If the step 414 evaluates to no whereby CJ is not assigned the current segment, control proceeds to the step 416.

At the step 416, processing can select an alternative core CK to be assigned the current segment for processing. The step 416 can include updating the core mapping for the starting LA of the current segment to indicate CK as the affined core. In at least one embodiment, the step 416 can include updating a corresponding entry of table denoting the core mappings such as described in connection with FIGS. 3A and 3B. The step 416 can include assigning and sending the current segment to the affined core CK for XCOPY processing. Consistent with other discussion herein, such XCOPY processing for the current segment can include copying the current segment to a corresponding destination logical address of a target locations identified in the XCOPY command. From the step 416, control proceeds to the step 420.

If the step 414 evaluates to yes where CJ is to be assigned the current segment, control proceeds to the step 418.

At the step 418, processing can update the core mapping for the starting LA to indicate that CJ is the affined core. Processing of step 418 can include assigning and sending the current segment to the affined core CJ for XCOPY processing. From the step 418, control proceeds to the step 420.

At the step 420, a determination can be made as to whether all segments of the source location of the XCOPY commands received in the step 402 have been assigned and sent to cores for processing. If the step 420 evaluates to no, control returns to the step 404 to process the next segment of the source location of the XCOPY commands. Otherwise if the step 420 evaluates to yes, processing stops.

Referring to FIG. 3B, shown is a second flowchart 450 of processing steps that can be performed in at least one embodiment in accordance with the techniques of the present disclosure. The processing of FIG. 3B provides further detail that can be performed in the step 408 of FIG. 4A.

At the step 452, processing can determine, based on remapping criteria, whether to use the affined core of the existing core mapping for LA, or an alternative core. From the step 452, control proceeds to the step 454.

At the step 454, a determination is made as to whether, based on step 452 and the remapping criteria, to use the affined core of the existing core mapping for the starting LA of the current segment. If the step 454 evaluates to no, control proceeds to the step 456.

At the step 456, processing can be performed to select an alternative core CK based on the remapping criteria and/or additional conditions or criteria for alternative core selection. The step 456 can include updating the core mapping for the starting LA for the current segment to indicate CK as the affined core. The step 456 can include assigning and sending the current segment to the affined core CK for XCOPY processing.

If the step 454 evaluates to yes whereby the affined core of the existing core mapping is to be assigned the current segment, control proceeds to the step 458.

At the step 458, processing can assign and send the current segment to the affined core of the existing core mapping for XCOPY processing.

Figure 5A:
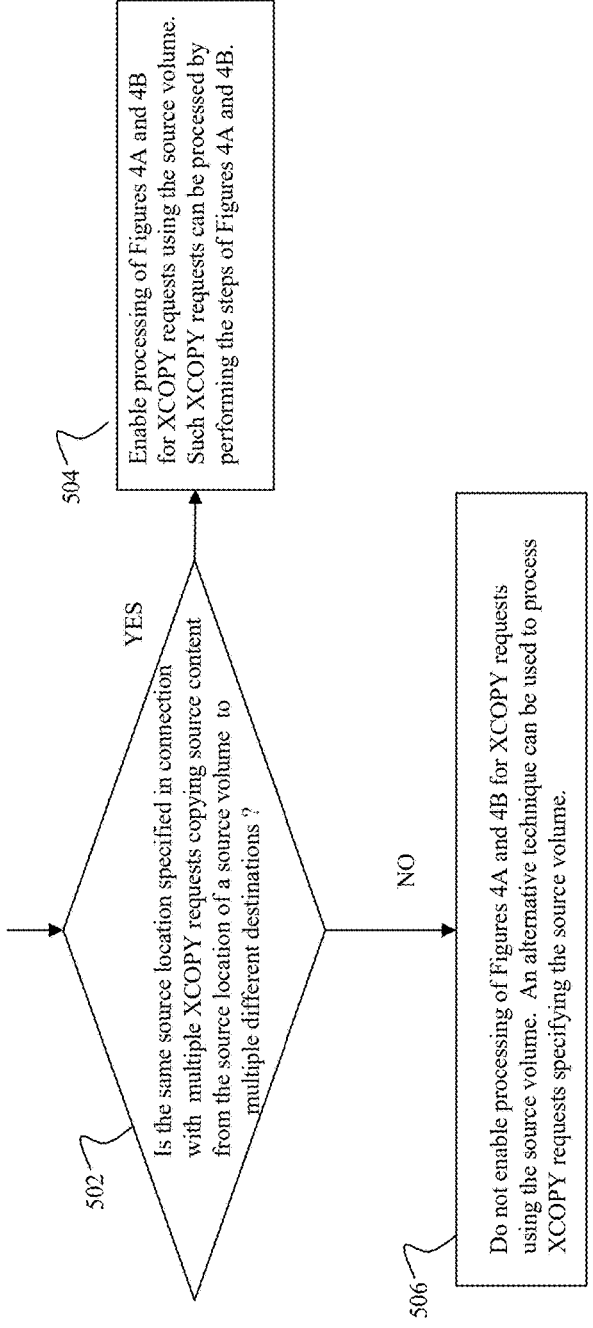

Referring to FIG. 5A, shown is a flowchart 500 that can be performed in at least one embodiment in accordance with the techniques of the present disclosure.

Figure 4B:
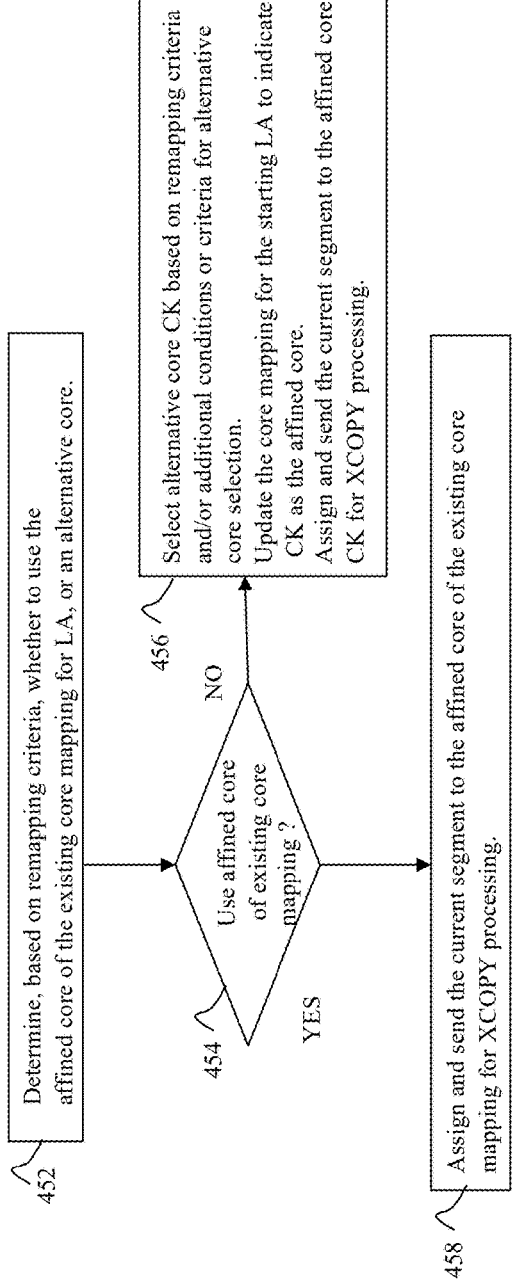

Generally, the flowchart 500 can be characterized as an outer loop of processing that provides for conditionally performing the steps of FIGS. 4A and 4B based on whether the storage system has detected that the same source location of a source volume is specified in connection with multiple XCOPY requests copying the same source content to multiple different destinations.

At the step 502, a determination is made as to whether the same source location of a source volume is specified in multiple XCOPY commands or requests copying the same source content to multiple different destinations. The step 502 can include determining whether any segment of the source volume is specified in multiple XCOPY commands that copy the same segment of the source volume to multiple different destinations. If the step 502 evaluates to yes, control proceeds to the step 504.

At the step 504, processing of FIGS. 4A and 4B can be enabled for XCOPY requests using the source volume. Such XCOPY requests can be processed by performing the steps of FIGS. 4A and 4B

If the step 502 evaluates to no, control proceeds to the step 506.

At the step 506, processing of FIGS. 4A and 4B may not be performed for XCOPY requests using the source volume. Such XCOPY requests using the source volume can be processed using an alternative technique.

FIG. 5A processing provides for enabling use of the techniques of the present disclosure of FIGS. 4A and 4B at the per source volume level. As a variation, an embodiment can use a different level of granularity than at the per source volume level. For example, in at least one embodiment with reference to the flowchart 550 of FIG. 5B, the processing of FIGS. 4A and 4B can be enabled and performed at the sub-volume level such as per source location, per segment level and/or other suitable granularity level.

At the step 552, a determination is made as to whether the same source location of a source volume is specified in multiple XCOPY commands or requests copying the same source content to multiple different destinations. The step 552 can include determining whether any segment of the source volume is specified in multiple XCOPY commands that copy the same segment of the source volume to multiple different destinations. The step 552 can be similar to the step 502 of FIG. 5A If the step 552 evaluates to yes, control proceeds to the step 554.

At the step 554, processing of FIGS. 4A and 4B can be enabled for XCOPY requests using the source location. Such XCOPY requests can be processed by performing the steps of FIGS. 4A and 4B

If the step 552 evaluates to no, control proceeds to the step 556.

At the step 556, processing of FIGS. 4A and 4B may not be performed for XCOPY requests using the source location. Such XCOPY requests using the source location can be processed using an alternative technique.

The techniques herein can be performed by any suitable hardware and/or software. For example, techniques herein can be performed by executing code which is stored on any one or more different forms of computer-readable media, where the code can be executed by one or more processors, for example, such as processors of a computer or other system, an ASIC (application specific integrated circuit), and the like. Computer-readable media can include different forms of volatile (e.g., RAM) and non-volatile (e.g., ROM, flash memory, magnetic or optical disks, or tape) storage which can be removable or non-removable.

While the techniques of the present disclosure have been presented in connection with embodiments shown and described in detail herein, their modifications and improvements thereon will become readily apparent to those skilled in the art. Accordingly, the spirit and scope of the techniques of the present disclosure should be limited only by the following claims.

What is claimed is:

1. A computer-implemented method comprising:
receiving a first extended copy request to copy first source content from a first source location to a first target location;
partitioning the first source content into a plurality of segments; and
for each of the plurality of segments, performing first processing including:
determining, based at least in part, on a starting logical address of said each segment, one core of a plurality of cores;
determining, based on one or more remapping criteria, whether to assign said each segment to the one core for extended copy processing of said each segment for the first extended copy request; and
responsive to determining to assign said each segment to the one core for extended copy processing of said each segment for the first extended copy request, performing second processing including:
sending said each segment to the one core for extended copy processing of said each segment by the one core; and
updating a corresponding core mapping, for said starting logical address of said each segment, to specify to use the one core for extended copy processing of said each segment in connection with subsequent extended copy requests.

2. The computer-implemented method of claim 1, wherein the plurality of segments includes a first segment, wherein said first processing for the first segment includes:
determining, based at least in part, on a first starting logical address of the first segment, a first core of the plurality of cores; and
determining, based on the one or more remapping criteria, to assign the first segment to the first core for extended copy processing of the first segment for the first extended copy request.

3. The computer-implemented method of claim 2, wherein the second processing for the first segment includes:

updating a first core mapping for the first starting logical address of the first segment to specify to use the first core for copying the first segment in connection with the one or more subsequent extended copy requests.

4. The computer-implemented method of claim 3, further comprising:

receiving a second extended copy request to copy the first source content from the first source location to a second target location which is different from the first target location, wherein the second extended copy request is included in the subsequent extended copy requests;

partitioning the first source content into a second plurality of segments including the first segment with the first starting logical address;

determining, based on the first starting logical address, that the first segment has the first core mapping identifying the first core; and determining, based on the one or more remapping criteria and as identified using the first core mapping, to assign the first segment to the first core for extended copy processing of the first segment of the second extended copy request.

5. The computer-implemented method of claim 4, wherein said extended copy processing of the first segment for the second extended copy request by the first core includes:

copying, by the first core, said first segment from the first starting logical address of the first segment to a corresponding target logical address of the second target location of the second extended copy request.

6. The computer-implemented method of claim 3, further comprising:

receiving a second extended copy request to copy the first source content from the first source location to a second target location which is different from the first target location, wherein the second extended copy request is included in the subsequent extended copy requests;

partitioning the first source content into a second plurality of segments including the first segment with the first starting logical address;

determining, based on the first starting logical address, that the first segment has the first core mapping identifying the first core;

determining, based on the one or more remapping criteria and as identified using the first core mapping, not to assign the first segment to the first core for extended copy processing of the first segment of the second extended copy request; and responsive to determining not to assign the first segment to the first core for extended copy processing of the first segment of the second extended copy request, performing third processing.

7. The computer-implemented method of claim 6, wherein the third processing includes:

determining, based on the one or more remapping criteria, a second core of the plurality of cores;

sending the first segment to the second core for extended copy processing of the second segment of the second extended copy request; and updating the first core mapping, for the first starting logical address of the first segment, to specify to use the second core for extended copy processing of the first segment in connection with subsequent extended copy requests.

8. The computer-implemented method of claim 7, wherein said extended copy processing of the second segment of the second extended copy request by the second core includes:

copying, by the second core, said first segment from the first starting logical address of the first segment to a corresponding target logical address of the second target location of the second extended copy request.

9. The computer-implemented method of claim 1, wherein said extended copy processing of said each segment for the first extended copy request by the one core includes:

copying, by said one core, said each segment from the starting logical address of said each segment to a corresponding target logical address of the first target location of the first extended copy request.

10. The computer-implemented method of claim 1, wherein the one or more remapping criteria specifies to assign said each segment to the one core for extended copy processing of said each segment for the first extended copy request if the one core is not performing background processing.

11. The computer-implemented method of claim 1, wherein the one or more remapping criteria specifies to assign said each segment to the one core for extended copy processing of said each segment for the first extended copy request if the one core is not performing flush processing.

12. The computer-implemented method of claim 1, wherein the one or more remapping criteria specifies to assign said each segment to the one core for extended copy processing of said each segment for the first extended copy request if the one core is not performing processing for a task having a higher priority than extended copy processing.

13. The computer-implemented method of claim 1, wherein the one or more remapping criteria specifies to assign said each segment to the one core for extended copy processing of said each segment for the first extended copy request if the one core has a workload below a specified threshold level.

14. The computer-implemented method of claim 13, wherein the workload of the one core is determined, based at least in part, on any one or more of: i) a utilization of said one core; ii) a queue length of pending or incomplete jobs, tasks or threads assigned to the one core where each item in the queue denotes a job, task or thread scheduled for execution on the core but whose processing is not yet complete; and iii) the average I/O latency of said one core.

15. The computer-implemented method of claim 1, wherein the plurality of cores are cores of an I/O core set dedicated to servicing client commands and requests that read and/or write content.

16. The computer-implemented method of claim 1, further comprising:

recording the first extended copy request in a log; and responsive to recording the first extended copy request in the log, returning an acknowledgement to the first extended copy request.

17. The computer-implemented method of claim 16, further comprising:

flushing the first extended copy request from the log, including:

creating and/or updating first mapping information that maps the first target location to the first source content of the first source location.

18. The computer-implemented method of claim 1, wherein each of the plurality of cores has a corresponding one of a plurality of indices denoting a sequence of consecutive integers beginning with 0, wherein N denotes a number of cores of the plurality of cores, where each of the plurality of segments is a defined segment size, and wherein said determining the one core, based at least in part, on the starting logical address of said each segment, includes:

calculating an index of the one core by determining a remainder of the starting logical address of said each segment divided by a first quantity, where the first quantity is a mathematical product of N multiplied by the defined segment size.

19. A system comprising:

one or more processors; and one or more memories comprising code stored thereon that, when executed, performs a method comprising:

receiving a first extended copy request to copy first source content from a first source location to a first target location;

partitioning the first source content into a plurality of segments; and for each of the plurality of segments, performing first processing including:

determining, based at least in part, on a starting logical address of said each segment, one core of a plurality of cores;

determining, based on one or more remapping criteria, whether to assign said each segment to the one core for extended copy processing of said each segment for the first extended copy request; and responsive to determining to assign said each segment to the one core for extended copy processing of said each segment for the first extended copy request, performing second processing including:

sending said each segment to the one core for extended copy processing of said each segment by the one core; and updating a corresponding core mapping, for said starting logical address of said each segment, to specify to use the one core for extended copy processing of said each segment in connection with subsequent extended copy requests.

20. One or more non-transitory computer readable media comprising code stored thereon that, when executed, perform a method comprising:

receiving a first extended copy request to copy first source content from a first source location to a first target location;

partitioning the first source content into a plurality of segments; and for each of the plurality of segments, performing first processing including:

determining, based at least in part, on a starting logical address of said each segment, one core of a plurality of cores;

determining, based on one or more remapping criteria, whether to assign said each segment to the one core for extended copy processing of said each segment for the first extended copy request; and responsive to determining to assign said each segment to the one core for extended copy processing of said each segment for the first extended copy request, performing second processing including:

sending said each segment to the one core for extended copy processing of said each segment by the one core; and updating a corresponding core mapping, for said starting logical address of said each segment, to specify to use the one core for extended copy processing of said each segment in connection with subsequent extended copy requests.

\* \* \* \* \*